(12) United States Patent
Fee et al.

(10) Patent No.: US 7,742,703 B2
(45) Date of Patent: *Jun. 22, 2010

(54) CHARACTERIZATION AND CONTROL OF OPTICAL DISPERSION COMPENSATING ELEMENT

(75) Inventors: John A Fee, Garland, TX (US); Frank A McKiel, Colorado Springs, CO (US)

(73) Assignee: Verizon Business Global LLC, Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/483,517

(22) Filed: Jun. 12, 2009

(65) Prior Publication Data

US 2009/0245787 A1 Oct. 1, 2009

Related U.S. Application Data

(63) Continuation of application No. 10/747,567, filed on Dec. 29, 2003, now Pat. No. 7,580,639.

(51) Int. Cl.
*H04B 10/12* (2006.01)
(52) U.S. Cl. .......................... 398/148; 398/87; 398/147
(58) Field of Classification Search ............. 398/25–29, 398/81, 84, 87, 147–149, 158–159, 192
See application file for complete search history.

(56) References Cited

U.S. PATENT DOCUMENTS

| | | | |
|---|---|---|---|
| 5,007,705 A | | 4/1991 | Morey et al. |
| 5,499,134 A | | 3/1996 | Galvanauskas et al. |
| 5,694,501 A | | 12/1997 | Alavie et al. |
| 5,701,188 A | | 12/1997 | Shigematsu et al. |
| 5,930,414 A | * | 7/1999 | Fishman et al. ............... 385/11 |
| 6,169,831 B1 | | 1/2001 | Adams et al. |
| 6,181,852 B1 | | 1/2001 | Adams et al. |
| 6,192,177 B1 | | 2/2001 | Amundson et al. |
| 6,285,812 B1 | | 9/2001 | Amundson et al. |
| 6,303,182 B1 | | 10/2001 | Eggleton et al. |
| 6,307,988 B1 | | 10/2001 | Eggleton et al. |
| 6,351,585 B1 | | 2/2002 | Amundson et al. |
| 6,370,300 B1 | | 4/2002 | Eggleton et al. |
| 6,386,714 B1 | | 5/2002 | Eggleton et al. |
| 6,427,040 B1 | | 7/2002 | Ahuja et al. |
| 7,123,844 B2 | * | 10/2006 | Myrick ....................... 398/192 |
| 2003/0086139 A1 | * | 5/2003 | Wing So ..................... 359/130 |
| 2003/0223689 A1 | * | 12/2003 | Koch et al. ..................... 385/37 |
| 2004/0005116 A1 | | 1/2004 | Sweetser et al. |

OTHER PUBLICATIONS

Co-pending U.S. Appl. No. 10/747,567, filed Dec. 29, 2003 entitled "Characterization and Control of Optical Dispersion Compensating Element", 68 pages.

(Continued)

*Primary Examiner*—Dzung D Tran

(57) ABSTRACT

An apparatus and method are applied to characterizing an dispersion-affecting element for use in controlling chromatic dispersion in an optical communications link. Information regarding the behavior of the dispersion-affecting element is recorded and stored in a medium that is provided for deployment with the dispersion-affecting element to enable improved management and active control of the dispersion-affecting element. The suitability of the dispersion-affecting element for operating under different conditions may also be characterized.

20 Claims, 10 Drawing Sheets

OTHER PUBLICATIONS

Chotard et al., "Group Delay Ripple of Cascaded Bragg Grating Gain Flattening Filters", IEEE Photonics Technology Letters, Aug. 2002.

Scheerer et al., "Influences of Filter Group Delay Ripples on System Performance", Proceedings of ECOC 99, vol. 1, 1999, pp. 410-411.

Sumetsky et al., "Theory of Group Delay Ripple Generated by Chirped Fiber Gratings", Optics Express, vol. 10, No. 7, Apr. 8, 200, pp. 332-340.

Fan et al., "Chirped Fiber Grating Characterization with Phase Ripples", OSA Optical Fiber Communications (Optical Society of America, Washington, DC), 2003.

Rourke et al., "Fabrication and System Performance of Dispersion Compensating Gratings", ECOC'99, Nice, France, 1999.

Li et al., Impact Dispersion Compensating Grating to OC-192 System.

* cited by examiner

CHARACTERIZATION AND CONTROL OF OPTICAL DISPERSION COMPENSATING ELEMENT

This application is a continuation of U.S. patent application Ser. No. 10/747,567, filed Dec. 29, 2003 now U.S. Pat. No. 7,580,639, the disclosure of which is incorporated herein by reference.

FIELD OF THE INVENTION

The present invention relates generally to chromatic dispersion compensation in optical communications systems, and more particularly to a method and system for predicting or improving the performance of a dispersion compensating element in an optical communications system.

BACKGROUND

In a long optical fiber communications link, chromatic dispersion of the fiber media causes portions of an intensity modulated signal to arrive at the receiver at slightly different times. This temporal pulse distortion leads to intersymbol interference and effectively limits the usable bandwidth of the fiber. The dispersion experienced through a given fiber is proportional to both the wavelength carried and the length of the fiber.

A typical single mode fiber will exhibit a dispersion of about 17 picoseconds per nanometer per kilometer (ps/nm-km) at a wavelength of 1545 nanometers. The dispersion changes with a positive slope of about 0.09 ps/nm-km per nm as the carrier wavelength is varied. Thus, at wavelength 1560 nm, the same typical fiber would have a dispersion of about 18.4 ps/nm-km.

One solution to the high dispersion characteristics of typical fibers at currently used wavelengths involves the use of dispersion shifted fiber. Dispersion shifted fiber is constructed so as to have nearly zero dispersion at a wavelength of about 1550 nm. However, dispersion shifted fiber still has a delay slope, which results in nonzero dispersion values at all other wavelengths. Thus, dispersion shifted fiber offers only limited relief in a multi-wavelength environment.

A substantial amount of existing fiber is of the non-dispersion shifted variety. Engineers have sought ways to expand the usefulness of these installed fibers rather than replace them. One common technique is to incorporate dispersion compensation into the regenerative devices that are spaced along the fiber path. For this purpose, a special dispersion compensating fiber (DCF) has been developed. One commonly available form of dispersion compensating fiber has a dispersion of −80 ps/nm-km at a wavelength of 1545 nm and a negative slope of −0.15 ps/nm-km. Specific lengths of DCF can be inserted periodically into a fiber system to reduce the dispersion effects.

Another way of performing dispersion compensation involves the use of a Bragg grating or dispersion compensating grating. A dispersion compensating grating is a length of fiber in which the index of refraction of the fiber varies at selected spacings along the length of the fiber. This causes selective reflection of wavelengths that are congruent to the grating spacing. If the spacing between these variations is constant along the length of the grating, then the grating will reflect a narrow range of wavelengths whereas all other wavelengths will simply pass through the grating. A Bragg grating may be used to exhibit a dispersion slope by gradually varying the spacing along the length of the grating. The result is referred to as a "chirped" grating. One form of dispersion compensating grating may be made by gradually decreasing the spacings between the refractive index variations. This causes shorter wavelengths to travel further down the fiber grating before being reflected, in other words, before encountering spacings comparable to the wavelength. In this arrangement, shorter wavelengths will experience longer travel times resulting in a negative dispersion slope. By the appropriate selection of length and range of spacings, a dispersion compensating grating can be designed to compensate for a given dispersion characteristic. A dispersion compensating grating of only 10 cm in length can replace tens of kilometers of dispersion compensating fiber.

Because of the manner in which it is fabricated, a typical dispersion compensating grating exhibits a delay versus wavelength response that is not perfectly smooth. A dispersion compensation grating introduces variations in delay as a function of wavelength that may be described as "ripple" upon the dispersion characteristic curve. This ripple can lend sufficient phase variation (dispersion) over a narrow range of wavelengths so as to impair significantly the quality of a modulated optical channel. In situations where the average compensation of the dispersion compensating grating may appear adequate for use in a given optical path, the localized delay ripple characteristics of the dispersion compensating grating may render it unsuitable for use at some wavelengths and modulation rates.

SUMMARY OF THE INVENTION

The present invention relates to characterizing the performance of a Bragg grating in the role of a dispersion modifying element in an optical communications system.

Some embodiments of the present invention provide for characterizing a grating and determining suitability of the grating to be used at specific wavelengths, bit rates, modulation formats, and dispersion slope characteristics.

Some embodiments of the present invention provide for expressing a general figure of merit indicating the suitability of a grating for specific types of applications, such as for use with optical signals having certain modulation bit rates. Various embodiments of the present invention may implement a pass/fail indication by measuring the grating against certain criteria. Some embodiments of the present invention may provide a plot of suitability as a function of parameters such as optical carrier wavelength, modulation bit rate/format and dispersion slope.

Some embodiments of the present invention provide for assessing and expressing the tunability of the grating, meaning its ability to be actively controlled in a useful manner to adapt to the needs of the application. Some aspects of the present invention also relate to characterizing the behavior of a grating under various conditions, storing the characterization information and then applying the characterization in adjusting the grating while it is in use to carry communications traffic. In accordance with various embodiments, the stored characterization information may include such things as pass/fail status, range of parameters within which the grating has been tested or is suitable for operation, recording of performance as a function of wavelength or grating stress, measurements from test receiver devices, instructions relating to how the grating should be controlled under various circumstances and quality factors or performance metrics derived from measurements of the grating.

In accordance with some embodiments, a dispersion compensating element employing a grating may communicate with a supervisory or network management system to provide indication of performance degradations which are anticipated based on the stored characterization information. Some embodiments may also involve the dispersion compensating element awaiting permission from the supervisory function to engage in adjustments that may impact performance. The dispersion compensating element may also respond to hypothetical requests by indicating achievable performance anticipated for a given set of operating parameters.

Aspects of the present teachings provide for a device for affecting dispersion in an optical communications link comprising a dispersion-affecting element and an electronically readable data storage element bearing characterization information pertaining to the dispersion-affecting element. Aspects of the present teachings provide for a method of assessing a dispersion-affecting element for affecting dispersion in an optical communication system, the method comprising coupling an optical signal into the dispersion-affecting element, obtaining a measurement related to the response of the dispersion-affecting element to the optical signal, recording characterization information related to the measurement in a data storage element, and providing the data storage element with the dispersion-affecting element, wherein the characterization information is made available for use during eventual deployment of the dispersion-affecting element in an optical communication link.

BRIEF DESCRIPTION OF THE DRAWINGS

Other variations, features and advantages exhibited by embodiments of the present invention will be evident by referring to the detailed description of some exemplary embodiments, which follows below, taken in conjunction with the attached drawings wherein.

DETAILED DESCRIPTION OF EXEMPLARY EMBODIMENTS

The making and using of various illustrative embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention. It will be apparent that many of the present teachings may be applicable to the characterization of dispersion compensating modules and tunable dispersion compensating modules, regardless of whether or not a fiber Bragg grating is employed as the dispersion-affecting element.

Figure 1:
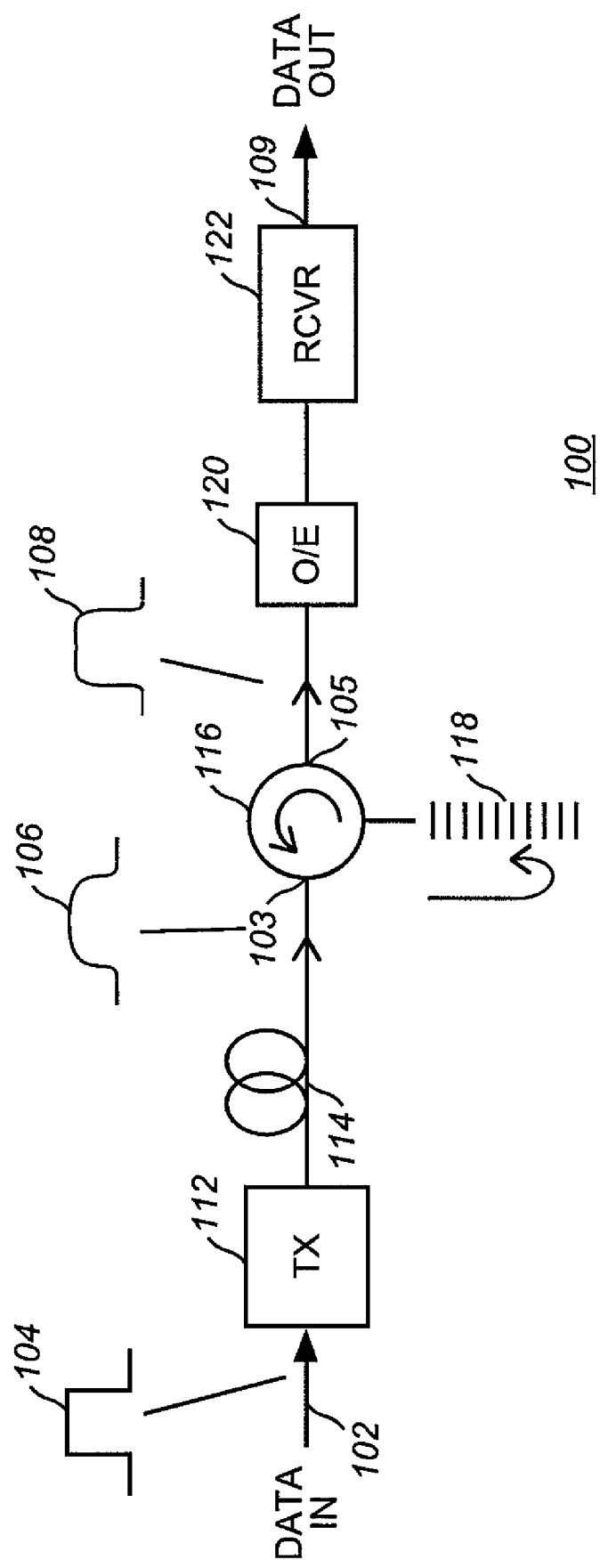
FIG. 1 depicts a typical optical link employing a dispersion compensating grating.

FIG. 1 illustrates a typical optical communications link 100 employing a fiber Bragg grating to compensate for dispersion caused by propagation through a long optical fiber. Optical transmitter 112 emits an optical carrier signal of a particular wavelength. This carrier signal is intensity modulated by a data input signal that essentially causes the optical signal to be gated on and off. Signals along data input 102 may be, for example, SONET-type STS-48 or STS-192 electrical signals at roughly 2.5 Gb/s (gigbits per second) or 10 Gb/s or other signals of various bit rates. Signals along data input 102 may cause the transmitter to operate in an RZ (return-to-zero) or NRZ(non-return-to-zero) mode, referring to whether the signal adopts a 'zero' state between the transmission of adjacent 'one' values.

The modulated optical signal from transmitter 112 is coupled to an optical fiber 114, which may be of considerable length (tens or hundreds of kilometers) and may exhibit a positive dispersion effect that tends to 'smear' pulses modulated upon the optical carrier signal. This effect is illustrated by comparing nearly ideal input signal 104 to the distorted signal 106 obtained after the signal has passed through a substantial length of optical fiber 114. The distortion of signal 106 makes it difficult or impossible to accurately reconstruct the data signal that was applied at input 102.

Accordingly, to correct the distortion, a fiber Bragg grating 118 is coupled to optical fiber 114 via an optical circulator 116. The modulated optical signal coming into port 103 of circulator 116 is directed to port 107 and propagates into grating 118. Various frequency components of the modulated signal (spanning a few GHz in either side of the carrier frequency) will be reflected at slightly different points along the length of the grating. The reflected components travel upward into port 107 of the circulator and are then directed to output port 105.

As indicated by signal 108, the distortion of the signal has been largely corrected by the grating and the signal now more closely resembles the original input signal 104. This signal may then be coupled into a optical/electrical transducer 120 (such as a photodiode) and a receiver 122 so as to render, at data output 109, an accurate reproduction of the data signal provided along input 102. Alternatively, the signal present at circulator port 105 may be coupled to further lengths of fiber 114 and possibly to other dispersion compensating elements.

Although it is shown that the grating 118 is placed after fiber 114 and that grating 118 acts to exactly compensate the effects of fiber 114, it is possible that grating 118 precedes the fiber for which compensation is provided or that the grating may be selected to under-compensate or overcompensate dispersion for other reasons. For example, it may be preferable to maintain some residual dispersion to minimize four-wave mixing due to non-linear behavior at high power levels. It should be understood throughout the discussion herein that a desired level of dispersion may be introduced which may or may not accomplish exact or total cancellation of dispersion within the signal exiting the dispersion compensator.

As a by-product of the manner in which they operate, fiber Bragg gratings exhibit group delay characteristics that fluctuate as a function of wavelength. This fluctuation or 'ripple' may resemble a complex mixture of roughly sinusoidal periodic components and/or quasi-periodic noise. Ripple may be observed as localized deviations in the group delay of the grating in comparison to a linear dispersion characteristic. Despite very consistent manufacturing processes, each fiber Bragg grating exhibits a fairly unique delay ripple characteristic. This attribute thwarts the ability to, for example, intentionally produce complementary pairs of gratings that can effectively cancel out each others' ripple behavior. Localized ripple slope can cause excessive differential group delay among the various frequency components of a modulated optical carrier. The wider the signal bandwidth, such as at a relatively high bit rate of 40 Gb/s, the greater the probability that group delay may be adversely affected by ripple.

Another aspect of practical dispersion adjusting devices based on fiber Bragg gratings involves altering or controlling the grating. A Bragg grating will exhibit different characteristics as a function of temperature and applied forces, fields or other influences. Dispersion slope of a Bragg grating may drift slightly as the ambient temperature of the equipment fluctuates.

Several attributes are affected as a fiber Bragg grating is stressed. The lengthening of a Bragg grating, such as in response to heating or applied longitudinal tension, increases the spacing between the index perturbations. This causes shifting of the response of the grating to longer wavelengths and, simultaneously, expanding of the range of wavelengths that will be reflected by the grating. The overall dispersion slope of the grating also diminishes as the fiber is elongated.

Consequently, it is possible to exercise some degree of control over dispersion slope of a grating by applying heat, tension or other stress.

As one would expect, applying a force to a fiber grating also affects the ripple characteristic. The DGD ripple comprises many components and arises from such a complex mixture of interactions or phenomena that it is difficult to calculate how ripple behavior will change as a given fiber grating is subjected to stress.

It has been found empirically that stressing a fiber to elicit different dispersion slopes causes ripple characteristics to change in a complex fashion, rather than merely scaling in the wavelength dimension. Consequently, attempts to provide a grating that is tunable to a given dispersion slope are complicated by the prospect of ripple at a given wavelength changing erratically (though reproducibly) as the grating is stressed to different degrees.

Figure 2:
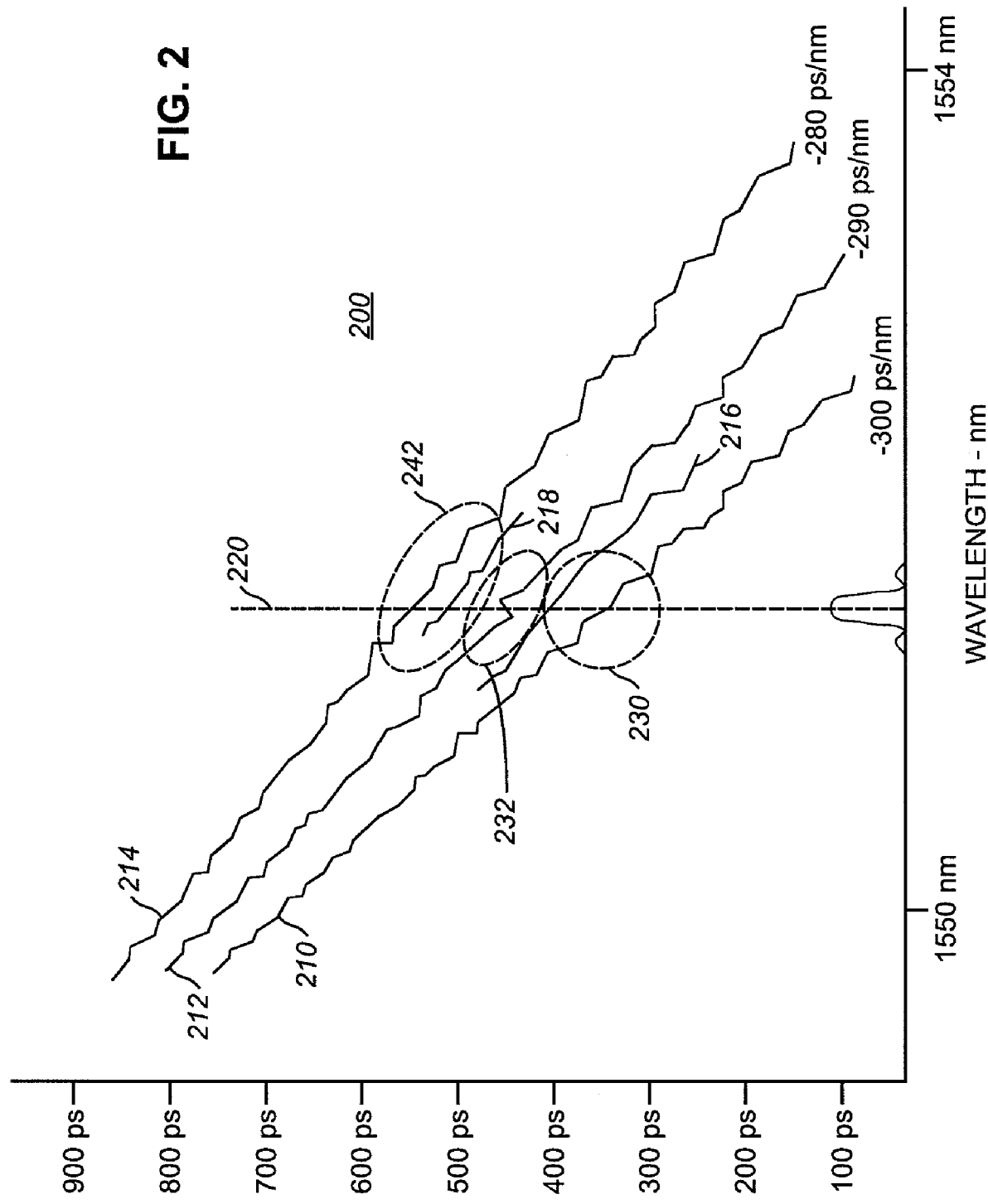
FIG. 2 is a plot of relative group delay as a function of wavelength for a dispersion compensating grating.

FIG. 2 depicts a plot 200 of the dispersion characteristics of a typical grating under various stress levels. The horizontal axis represents wavelength and the vertical axis represents picoseconds of delay. Plot 210 represents the dispersion characteristic of the grating under some nominal stress level. As mentioned before, this may or may not correspond to actual zero stress imposed in the fiber, the fiber may be made to provide, for example, a −350 ps/nm slope and then be subjected to a force when in use to manufacture a tunable device having a nominal slope of −300 ps/nm. This may be done to assure an adequate range of control on either side of the nominal slope value.

At a given carrier wavelength 220, the overall slope of characteristic 210 of around −300 ps/nm may be useful for correcting positive dispersion that has occurred on an optical link and has 'smeared' the frequency components of the carrier signal. Furthermore, the slight perturbations or ripple depicted on plot 210 also affect the modulated carrier and may cause the localized dispersion slope to deviate from the nominal value of −300 ps/nm.

Plot 214 depicts a characteristic of the same grating when a moderate stress is imposed. In plot 214, the grating exhibits a slope of around −280 ps/nm. Note, however, because of the ripple on plot 214, that the localized slope at wavelength 220 may actually be closer to −300 ps/nm.

Plot 212 depicts a characteristics of the same grating when a slight stress is applied to the fiber, the level of stress being intermediate to the levels of plots 210 and 214. At wavelength 220, the grating under this stress condition may provide an overall slope of approx. −290 ps/nm. As depicted, this may be a point at which the ripple is particularly pronounced and may cause substantial degradation of the signal.

A conventional compensating system using a very simple feedback system may try to provide a −300 ps/nm dispersion slope by using the characteristic at region 230. A conventional system will adjust the overall slope to be approximately −300 ps/nm and simply attempt to tolerate whatever degree of ripple happens to occur at that wavelength.

Some control systems may alter the stress on the grating to optimize the performance by observing the optical signal or monitoring receiver performance. Such systems may, for example, alter the grating to a point such as plot 216, where the net effect of slope and ripple achieve a localized minimum or partially offset one another.

It is important to recognize that there may be even better points of operation to achieve a given dispersion slope. For example, in FIG. 2, a portion of characteristic 218 is shown to offer very low ripple and exhibit a slope of around −284 ps/nm. In some situations, this operating point may be preferable to other points where the overall slope is exactly as desired but the local ripple effects are detrimental. For example, this point may be preferable when an overall slope of −278 ps/nm is needed. If the ripple characteristic of the grating has a ripple amplitude of 12 ps at −278 ps/nm and only 6 ps at −284 ps/nm, then the better operating point might be the latter.

Another important characteristic demonstrated in FIG. 2 is that a significant optimal value may lie behind a very poor value. While reasonably good operating points may be attained in region 230, a truly optimal value may be present at region 242. These two regions may be separated by an undesirable region 232 wherein ripple may cause a significant degradation. A conventional system making adjustment to the grating to optimize performance may find a local minimum in region 230 and not be aware that an even better solution may be available in region 242. Naturally, as the control system adjusts the grating in the direction of region 242, the grating will encounter region 232 and begin to exhibit poor performance. A conventional feedback system will avoid tuning the grating any further in this direction. In accordance with the present teachings, however, a control system may use data of the characteristic of the grating over a variety of conditions and may better achieve overall optimum operating points.

FIG. 2 may be used to illustrate yet another important principle related to certain of the present teachings. In some environments, it may be possible to cause wavelength 220 to shift slightly within a narrow range of wavelengths. In the scenario just described, this additional degree of freedom may be employed to allow even more sophisticated optimization involving the wavelength, the ripple characteristic and the overall grating slope. The wavelength may be adjusted to find better or more plentiful operating points that offer good performance. Even in installations where the wavelength is only allowed to be perturbed slightly and temporarily, the aspect of wavelength control may be employed to, for example, momentarily sidestep the problematic features of region 232 in transitioning from region 230 to region 242.

A manner of coordinating control among grating stress and wavelength to accomplish transitioning of this nature is described later in conjunction with FIG. 11. It should be appreciated for the present that a control system may also access information in the characterization data pertaining to how to move from one tuning point to another. In the present discussion, the manner in which controllable parameters are adjusted in a coordinated fashion to move from one tuning point to another is referred to as a 'tuning trajectory.' Optimum tuning trajectories may be decided and stored as part of a dispersion control system before the unit is deployed in a working optical link.

A tuning trajectory may be a recommended sequence of adjustments for transitioning from one operating point to another such that disruption to link performance is minimized. This is most useful when two or more parameters are subject to control, such as tuning stress applied to the grating and wavelength of the optical signal acted upon by the grating. Using the example scenario of FIG. 2, a strategy for avoiding region 232 while transitioning from region 230 to 242 may comprise instructions such as "adjust wavelength from 1551.4 nm to 1551.8 nm, then increase tuning to achieve −280 ps/nm slope, then set wavelength back to 1551.4 nm." A tuning trajectory may also be applicable to a single parameter, especially in relation to time-domain response, as will be described.

Figure 3:
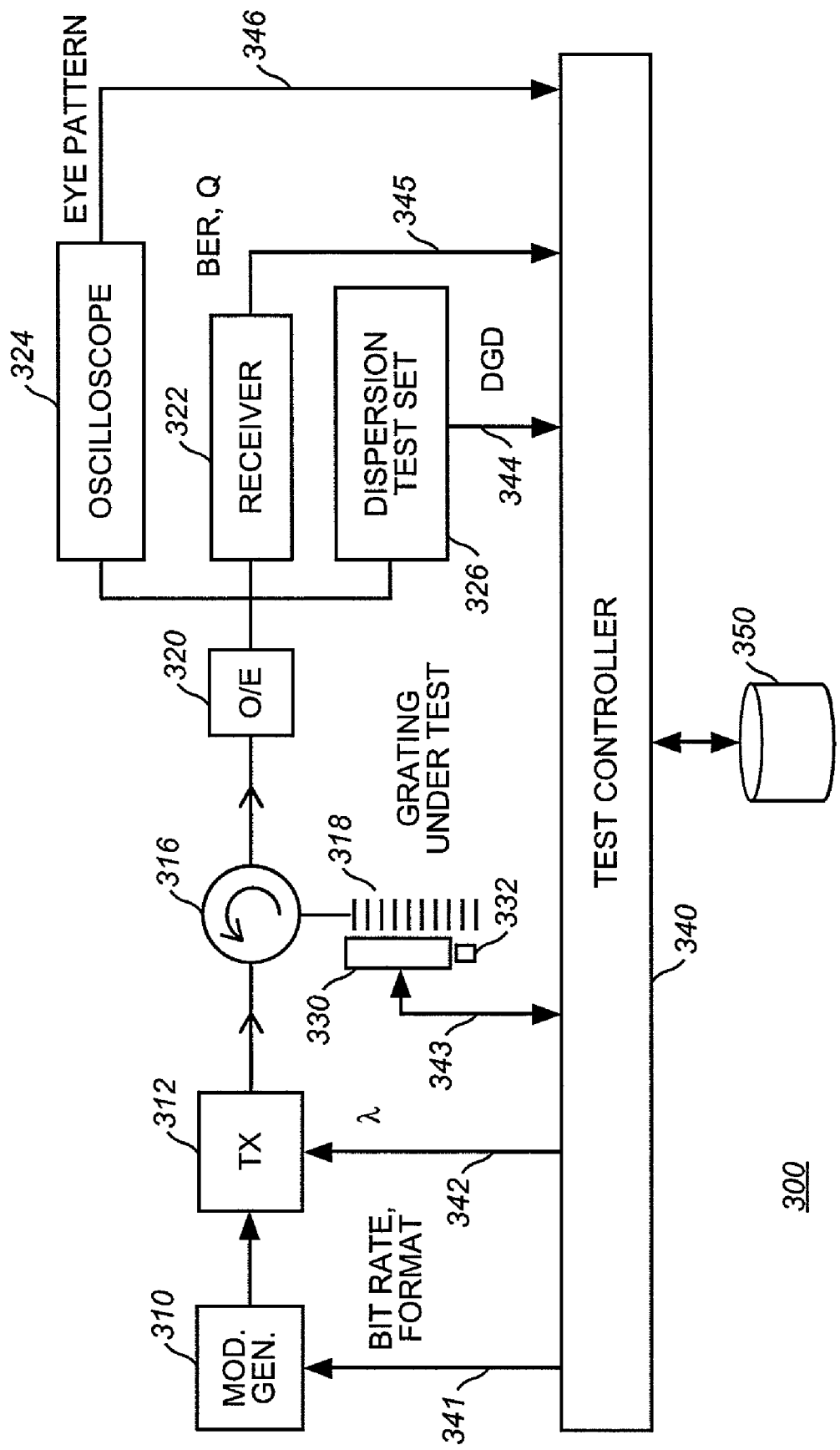
FIG. 3 describes an apparatus for testing and characterizing gratings in accordance with exemplary embodiments of the present invention.

FIG. 3 depicts an apparatus 300 for measuring the characteristics of a fiber Bragg grating in the role of a dispersion modifying element. Apparatus 300 may serve several purposes. Using apparatus 300, a grating may be tested and rated in terms of its suitability to be used at various dispersion slopes, wavelengths, modulation bit rates and modulation formats. An overall figure of merit for a range of parameters may be derived. Alternatively, the grating may be rated on a pass/fail basis according to certain minimum performance criteria. The attributes of the grating may also be reported as a plot of suitability as a function of some other parameter such as wavelength or dispersion slope, thus allowing a field engineer to make an informed choice of how the grating may be best applied.

Another use for apparatus 300 is to gage the 'tunability' of the grating. This may be related to the extent to which the grating characteristics can be altered by applying controlled stress. This may also relate to whether the grating can be adjusted to operate at virtually any combination of parameters. In other words, tunability may relate to completeness of coverage of the range of operating parameters and to continuity and repeatability of control characteristics. As with the intrinsic suitability of the grating described above, tunability may be a pass/fail criteria, may be expressed as a general figure of merit or may be reported as a plot of tuning characteristics as a function of other parameters.

Another role of apparatus 300 is to adequately characterize the behavior of a grating so that, in accordance with some embodiments of the present teachings, the characterization may later be used by a control system as the grating is being used in a communications link.

In FIG. 3, a test controller 340 serves to coordinate the elements of the test apparatus to perform tests and to record results, as will be explained. Test controller 340 may be implemented using a personal computer or a dedicated imbedded processor in a test equipment device, for example. A grating 318 to be tested and/or characterized is coupled to optical circulator 316 of the apparatus. Apparatus 300 provides an optical signal to the grating from transmitter 312. The wavelength emitted by transmitter 312 may be controlled or monitored by controller 340 by way of communications along connection 342.

Transmitter 312 is preferably modulated by input from modulation generator 310. The modulation signal may be high bit rate signals at frequencies of, for example, 2.5 GHz, 10 GHz, 40 GHz or even higher. Test controller 340 may control or monitor the modulation bit rate, format, subcarrier modulation or other parameters of the modulation signal provided by modulation generator 310 to transmitter 312. As used herein, the format of the modulation signal may, for example, refer to whether pulses are represented in an RZ or NRZ manner, what form of scrambling or line coding is applied, and whether the modulation affects the carrier in terms of frequency, amplitude, phase, pulse width, or a combination thereof.

Grating 318 may optionally be coupled to an actuator 330 to apply a variable stress or tuning influence to the grating. Actuator 330 may, for example, apply a variable mechanical force to stretch or bend the fiber grating. The mechanical actuator may be implemented using a linear motor, a solenoid, motor and leadscrew, a cam, a heated bimetallic element, a galvanometer, an electrostatic motor or a piezoelectric motive element, just to name a few examples. Those of ordinary skill in the relevant art may readily envision a variety of ways in which an actuator may be implemented and the present invention is not limited to any particular form of actuator, whether mechanical, thermal or otherwise.

Alternatively, the optical response of the grating may be affected by temperature, especially as temperature contributes to thermal expansion of the grating material. In his case, actuator 330 may comprise a heating or cooling element thermally coupled to the fiber grating. Actuator 330 may involve pumping energy into the fiber grating to cause heating or expansion or other effects that may alter the behavior of the grating. A powerful beam of light or radiant energy may be directed onto or through the fiber to cause heating. Heating need not be uniform across the length of the grating and may instead be carefully tapered or profiled along the length of the grating to provide special control of the grating response. Control of the optical response of the grating may be performed by controlling temperature at points along the grating. Acoustical energy may affect the behavior of the grating and may be therefore be used to control the grating. Electrical or magnetic fields of sufficient strength may also alter the characteristics of the grating.

An optional sensor 332 may act to measure one or all of the following: the amount of stress or tuning influence applied the grating, the amount of strain the grating undergoes in response to the applied stress and the optical response to the applied stress. Depending on how the stress is applied, such as whether by mechanical force or temperature control, sensor 332 may comprise a strain gage or force gage, a thermometer, an optical signal sensing device or some other form of sensor. Sensor 332 may be used to detect the amount of tuning influence applied, such as stretching force, or may be used to detect the response of the grating to the tuning influence, such as by measurement of strain or of changes in optical behavior. A combination of sensors may be employed. In some implementations, sensors may not be required. The actuator may applied a well calibrated force for which the grating performance is adequately characterized. Alternatively, a remote receiver or dispersion measuring device may provide adequate feedback for controlling the grating.

The amount of tuning influence applied to grating 318 may be controlled or monitored by test controller 340 by way of communications along connection 343. The control of how much stress is exerted by actuator 330 may be controlled by test controller 330 and may be separate from the reporting of stress or strain provided to controller 340 from sensor 332. Alternatively, sensor 332 may operate as part of an integrated control loop with actuator 330 such that the test controller 340 indicates a desired stress level and then the actuator 330 and sensor 332 automatically achieve and maintain the requested stress level. This may involve a controller (not explicitly shown) being associated with the actuator 330 and sensor 332 and acting upon instructions from the test controller 340 as to the stress level desired.

Although it is primarily the fiber Bragg grating that exhibits unique properties, the testing and characterization may be performed on an assembly comprising the grating along with other elements. The tested element may be grating 318 alone, with the circulator 316, actuator 330 and sensor 332 being considered part of the test apparatus for measuring the grating. Alternatively, the tested element may further comprise any or all of the circulator 316, actuator 330 and sensor 330 as well as other elements or controllers that are intended to be characterized and deployed together as a unit.

To monitor the optical effects of grating 318 upon the optical signal provided by transmitter 312, an output port of circulator 316 may be coupled to various signal receiving and testing devices. The observable effects of the grating upon the optical signal may include such attributes as the proportion of the optical signal reflected or transmitted by the optical grating, the lowest or highest wavelengths reflected or transmitted by the grating, group delay experienced by the modulation signal, dispersion slope experienced by the modulation signal and variations of the group delay from a linear dispersion slope.

An optical-to-electrical transducer (O/E) 320, such as a photodiode, is used to detect the modulated optical signal and render a corresponding electrical signal. The electrical signal may then be coupled to one or more optional devices for receiving and analyzing the signal. As will be understood among those of ordinary skill, O/E 320 is often incorporated into the 'front end' of receiver 322 and perhaps other devices. In this variation, the optical signal may simply be coupled to one or more of the devices shown, with each device performing its own O/E conversion, of needed.

These devices are shown to include oscilloscope 324, receiver 322 and dispersion test set 326, although other devices for analyzing attributes of the signal may be useful in some contexts.

Oscilloscope 324 is used to view the shape of the modulation pulses from the grating, such as to determine whether the pulses more resemble the waveform 108 or the waveform 106 introduced in FIG. 1. Commonly, oscilloscope 324 displays or records an eye pattern by overlaying a large number of time-domain recordings of pulses. This provides a quick visual indication of relative signal quality. The traces captured by oscilloscope 324 may be analyzed to derive a figure of merit for the signal or to express the quality in terms of estimated bit error rate or power penalty. In gauging the severity of a transmission impairment, such as chromatic dispersion, power penalty is the increase in optical power that must reach a receiver to achieve the same bit error rate that was experienced before the impairment was introduced. As estimated from a measured eye pattern or, more specifically a histogram of signal levels, power penalty is sometimes called "eye opening power penalty" or EOPP, or DBQ.

Oscilloscope 324 may comprise, or be coupled to, a process or apparatus for analyzing the time-domain measurements of the pulses and determining the signal quality. Alternatively, oscilloscope 324 may provide raw data to test controller 324 and the test controller may perform the analysis. Oscilloscope 324 or an analyzer that can measure attributes of the time-domain signal may provide test controller 340 the ability to observe signal quality as other parameters are changed, such as the grating stress, transmitter wavelength and modulation characteristics.

Receiver 322 is comparable to a receiver normally used in a deployed optical link. Receiver 322 interprets the electrical domain signal provided by transducer 320 and renders a bit stream that ideally is identical to the modulation applied by modulation generator 310. Receiver 322 may provide an output of bit error rate (BER) indicating discrepancies between the original modulation applied by modulation generator 310 and the reconstructed bit stream as interpreted by receiver 322. In some implementations, discrepancies may be detected at the receiver by check bits and error correction techniques, even if the transmitted content is not known beforehand by the receiver. In other implementations, the bit stream provided by modulation generator 310 may also be provided to an analyzer associated with receiver 322 to facilitate comparison between transmitted and received data.

Another method of assessing received signal quality is implemented in some receivers. This measurement yields a so-called 'Q factor' and is obtained using an auxiliary receiver having freely adjustable decision threshold and sampling time offset. By altering the decision threshold and sampling timing, the auxiliary receiver can experiment with different settings to determine how much of a margin separates the received signal from a virtually unusable signal. For reference, a description of eye diagrams and of receiver-integrated Q-factor measurements is available in U.S. Pat. No. 6,583,903. As shown in FIG. 3, receiver 322 may produce either or both of BER and Q-factor measurements and provide these readings to text controller 340 along connection 345.

Dispersion test set 326 may be used to measure differential group delay and may be implemented using, for example, a Hewlett-Packard Model HP8753 Network Analyzer. The common methods for measuring group delay may require a type of modulation to be applied to the transmitter other than data pulses.

One technique commonly used is called the modulation phase-shift method (MPS) technique wherein a single frequency, preferably sinusoidal, modulation signal is applied, such as from modulation generator 310. The phase shift of the modulated signal is monitored as the optical carrier wavelength is varied. Test controller 340 may direct changes in wavelength of transmitter 312 while observing variations in group delay as manifest by phase shift in the sinusoidal modulation signal. For phase comparison, the signal used to modulate transmitter 312 may be provided to dispersion test set 326. Other methods for measuring group delay, such as the differential phase-shift (DPS) method, are commonly known and may be used as well. Dispersion test set 326 measures variations in group delay and provides this information to test controller 340 via connection 344. The output of dispersion test set 326 may resemble the scanned traces shown on FIG. 2 or may be measurements at specific selected wavelengths.

In FIG. 3, test controller 340 is coupled to a data store 350 for the purpose of recording characterization information pertaining to grating 318 as obtained by apparatus 300 during testing and characterization. This information may include such things as pass/fail status, range of parameters within which the grating has been tested or is suitable for operation, recording of performance as a function of wavelength or grating stress, measurements from devices 322, 324, 326, instructions relating to how the grating should be controlled according to circumstances and performance metrics or quality factors derived from measurements. The information in data store 350 may also relate to trajectories or pathways by which the grating should be transitioned from one combination of operating parameters to another.

The information stored in data store 350 may be provided in some form to a dispersion compensating device which employs the tested grating or to other elements involved in the optical link where the grating is used. Data store 350 may be implemented in a variety of ways including electronically readable or computer readable data such as read-only memory devices, non-volatile memory chips, flash memory, magnetic media or optical disks. Data store 350 may comprise a file on a computer hard drive, the contents of which are written to another more portable medium such as a memory chip to accompany the grating. The characterization information initially accumulated in data store 350 may also be transmitted by data communications to a point of use or to an entity that eventually purchases or deploys the grating.

The characterization performed by apparatus 300 and recorded in data store 350 may include dynamic or time-domain behavior of the optical grating or of a composite system comprising the grating and other components such as an actuator. The time-domain behavior of the grating or composite system in response to changes in tuning influence may be important for assuring optimum control in a live network. For example, to minimize disruption of traffic, it may be possible to rapidly move the grating from one combination of operating parameters to another combination and minimize the time spent in an intervening spot where the performance will be degraded. It is desirable to increase control speed without causing undue overshoot or settling time. Forehand knowledge of the dynamic response of the system allows for critical damping of the control system. The characterization information may include fairly raw information related to dynamic behavior or may provide explicit instructions related to recommended rate of change for various parameters.

The characterization performed by apparatus 300 and recorded in data store 350 may relate to determining the limits of tunability of the grating or of a composite system comprising the grating and other elements such as an actuator or a sensor. In the extreme, there may a practical limit or safe limit on the amount of tuning influence that may be applied to the grating, such as the maximum tension or temperature that can be applied without damaging the grating or shortening its service life. Tuning may also be limited by the abilities of the actuator or the sensors or even to power consumption at a remote site. Range of tunability may also be a affected by how efficiently the grating responds to a tuning influence. An aspect of measuring tunability and determining whether a grating is suitable to be deployed in the field may take into account, for example, whether the dispersion slope (or other performance attribute) varies sufficiently as the actuator operates between a minimum tuning influence and a maximum tuning influence. Characterization may involve determining the limits within which the grating can be operated. Characterization may involve calibrating, based on desired minimum and maximum dispersion slope values, a range of tuning influence the actuator must correspondingly apply. Of course, the linear elasticity of the grating may impose a practical limit on how much stress may be applied to the grating by the actuator.

An optical fiber or dispersive element may optionally be introduced at some point between the transmitter 312 and O/E 320 to purposefully inject a desired dispersion slope that the grating is expected to counteract. The extent of dispersion introduced in this fashion may be controlled or monitored by test controller 340, for example, by optically switching into the path various lengths of dispersive fiber.

Figure 4:
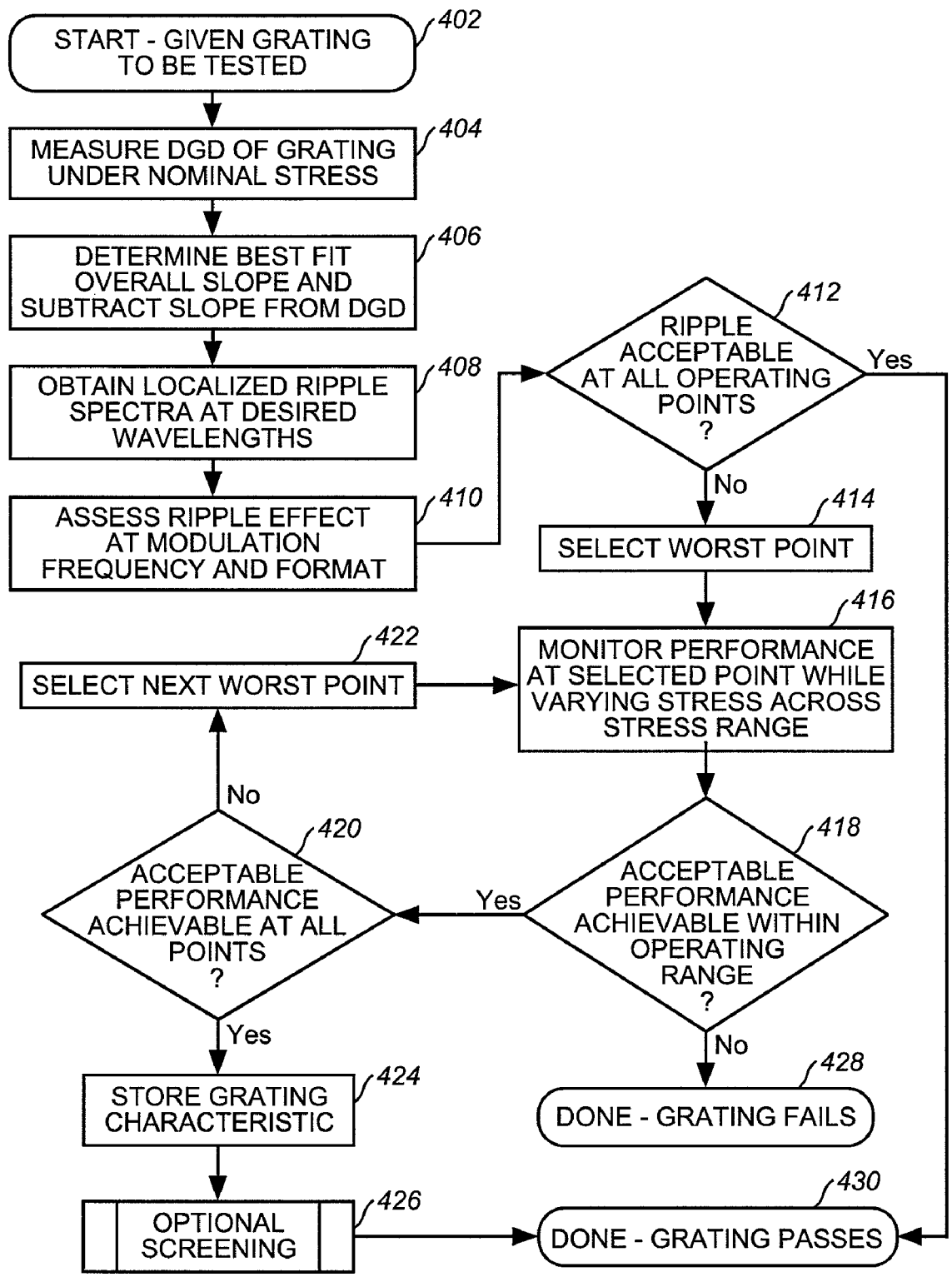
FIG. 4 depicts a process by which a dispersion compensating grating may be tested and characterized in accordance with exemplary embodiments of the present invention.

FIG. 4 depicts a process for evaluating and characterizing a chirped Bragg grating. Depending on the desired application, the function of the grating may be assessed at particular wavelengths or over a range of wavelengths and at a given dispersion slope or over a range of slopes. Additionally, the grating may be evaluated for its suitability to be used with optical carriers of different bit rates and of different formats (such as RZ versus NRZ). Characterization of a grating, or determination of its suitability for a desired use, may take into account the manner in which one or more performance attributes vary as a function of such parameters as optical signal wavelength, bit rate of modulation applied to the optical signal, format of modulation applied to the optical signal and dispersion slope exhibited by the grating. Characterization of a grating, or determination of its suitability for a desired use, may also be based on performance attributes as averaged over a range of values for any of these parameters. Best and worst case values of the performance attributes may also be considered or recorded.

It is worth noting that, because a grating may be influenced in a controlled way to exhibit a particular dispersion slope, dispersion slope can be viewed as a parameter or imposed condition under which the grating operates even though the dispersion slope is a response characteristic of the grating.

Process 400 for testing and characterizing a grating commences at step 402 when the grating is provided that needs to be evaluated. As mentioned above, the unit to be tested may be the grating alone or may be an assembly including other elements that were shown in FIG. 3. In step 404, the differential group delay(DGD) of the grating is measured over a range of wavelengths that are of interest. Whether using the MPS, DPS or some other form of measurement, it is preferable to use a low enough test modulating frequency to detect fine structure. Modulating frequencies of 62.6 MHz to 300 MHz are known to provide generally adequate resolution.

The measurements obtained in step 404 are comparable to the plots 210, 212, 214 in FIG. 2 showing delay in picoseconds versus wavelength in nanometers.

These measurements are then processed in step 406 to determine a linear slope that is a best fit to the group of measurements. The slope of this line represents the overall dispersion slope of the grating under the initial test conditions and may be one aspect of characterizing or qualifying the grating.

Further in step 406, the best fit line is subtracted from the measurements so that deviations from this line or 'ripple' may be investigated. When the grating is applied in the field, the overall slope is intended to cancel an opposing dispersion slope caused by other elements. Consequently, the overall slope is a known, desirable and possibly controllable characteristic. For the present purposes, it is important to focus upon the particular ripple effects which are more apt to pose a problem.

In step 408, the ripple characteristic derived from steps 404 and 406 is analyzed at one or more wavelengths. A continuous spectrum of wavelengths may be analyzed or selected wavelengths may be analyzed, perhaps corresponding to a specific channel plan such as the recommended channel allocations listed in ITU recommendation G.694.1. At each wavelength, the frequency content of the grating ripple in the vicinity of the transmitted optical signal wavelength is evaluated.

In step 410, the extent to which the ripple degrades performance is determined. A variety of ways in which ripple degradation may be measured and expressed are described later in conjunction with FIGS. 6-9.

Step 410 involves assessing performance at all points at which the grating is expected to perform when deployed, including all wavelengths and modulation bit rates or formats.

As used herein, an 'operating point' refers to a combination of parameters of the input optical signal, the stress applied to the grating and the intrinsic characteristics of the grating itself at which a user attempts to have the grating perform a dispersion compensating role. For compensating a given amount of dispersion slope there may be several levels of tuning stress that offer adequate performance even at a single wavelength.

In step 412, it is determined whether the grating exhibits adequate performance at all of these points at the initial or nominal stress level imposed in step 404. Beyond just determining whether a signal through the grating would be receivable, the adequacy of performance may take into account the margin by which the performance could degrade and still be acceptable. The adequacy of performance may take into account the 'stability' or relative difficulty in controlling carrier frequency or grating stress to maintain the grating in an acceptable operating state.

If, in step 412, it is determined that the ripple of the grating is acceptable under all conditions at which the grating is intended to be used, then execution of process 400 proceeds to step 430 wherein the grating is deemed to have passed the evaluation and the evaluation process is concluded.

Otherwise, if in step 412, it is determined that there is at least one combination of wavelength, modulation bit rate, format (and perhaps dispersion slope as controlled by stressing the grating) at which the ripple of the grating is problematic, then steps 414 through 426 are performed to determine if the grating can be tuned to improve performance at those points.

In step 414, the worst of these points is chosen. This selection may be based on, for example, degraded performance or difficulty in maintaining performance as conditions vary slightly.

In subsequent step 416, performance of the grating is monitored as stress, heat or other tuning methods are applied to alter the characteristics of the grating. This analysis is preferably performed over the entire stress operating range in order to elicit all possible regions that could offer improved performance. The monitoring of performance may be direct as by passing a modulated optical signal; through the grating and measuring eye diagram closure, power penalty or bit error rate. Alternatively the performance may be indirectly estimated by repeating DGD measurements over a narrow range of interest and seeking optimum points. A combination of these approaches may also be employed to verify the likely behavior of the grating when it is later deployed in the field.

After the characterization in step 416, step 418 is performed wherein it is determined whether any region of acceptable performance can be achieved within the range of stresses that can be applied to the fiber when it is deployed in a compensating device.

If adequate performance cannot be achieved by such tuning, then, in step 428, the grating is deemed to fail the evaluation and process 400 concludes.

If, in step 418, it is determined that the grating can be stressed into an acceptable operating point to alleviate the problem identified in step 414, then execution proceeds to step 420.

In step 420, it is determined if, for every desired combination of conditions at which the grating is expected to operate, there is a known way to obtain adequate performance from the grating, even if by applying stress within the allowable stress operating range.

If the grating can achieve adequate performance under all desired conditions, then in step 424, the characteristics of the grating are stored for later reference. The grating characterization data referred to in step 424 relates to the findings of process 400 as to how to obtain improved performance from the grating under various conditions.

In accordance with the present teachings, it is preferred that this information be provided with the grating and stored in a data memory of some nature in a dispersion control device that utilizes the grating. As will be shown, this characterization data permits improved control and optimization of dispersion compensation in a communications system. The characteristics data may amount to instructions to a control systems as to how the grating should be tuned.

Returning to step 420, if there are still other points at which the grating provides poor performance, execution moves to step 422 to select the next worst operating point and then to step 416 to iterate the process of finding a stress level at which the grating may offer improved performance. The net effect of steps 416 through 422 is to iterate though all points at which the grating performs poorly and to find better solutions by applying controlled stress to the fiber. Note that this selective approach may avoid the need to extensively characterize the grating across all possible values of stress level, wavelength, overall dispersion slope, modulation bit rate and modulation format. Of course, in some implementations, it may be desirable to obtain and store a very thorough characterization using the apparatus of FIG. 3.

When all problematic points of the grating have been satisfactorily characterized and overcome by tuning, and the preferred operating points have been recorded in step 424, then an additional optional step 426 may be performed to achieve further screening based on other characteristics. One such optional screening is described below in conjunction with FIG. 5.

Once any screening has been performed in step 426, then process 400 concludes in step 430 with the grating being deemed suitable for use under the range of conditions that were specified in steps 408 and 410.

Figure 5:
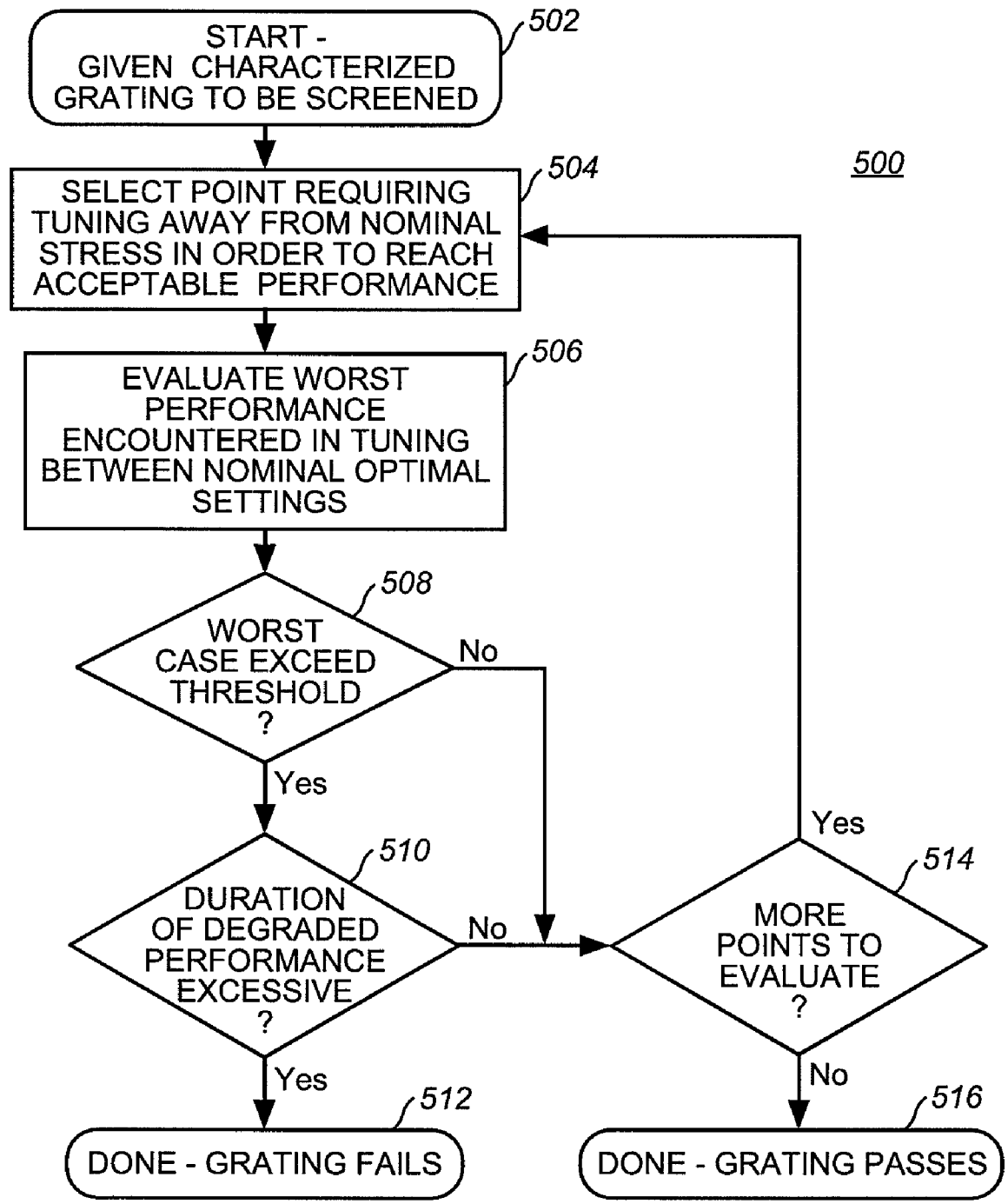
FIG. 5 depicts a process by which dispersion compensating gratings may be screened on the basis of performance exhibited in transitioning between operating parameters.

FIG. 5 depicts a process 500 by which a grating that has already been characterized according to process 400 may be further screen to reduce possible problems when the grating is deployed. The intent of process 500 is to evaluate worst case performance that might be experienced as a grating moves from one operating point to another.

In describing process 500, this aspect is assumed to be worth examining in cases where achieving of acceptable performance required tuning the grating away from a nominal or 'at rest' level. Process 500 commences in step 502 when a characterized grating is provided along with associated characterization data.

In step 504, one of the points at which the grating required tuning is selected for analysis in subsequent steps 506-508. In step 506, the characterization data describing ripple or a performance attribute as a function of applied tuning stress is analyzed and both the worst case performance and the range of stress values for which the performance suffers are noted. These attributes are considered in steps 508 and 510.

In step 508, the worst case performance encountered during tuning is compared to an arbitrary threshold. This threshold may be, for example, a value that may be tolerated briefly in a live communications link without causing catastrophic loss of communications. This threshold may be expressed as a maximum tolerable bit error at the receiver.

If the threshold is not exceeded, then execution proceeds to step 514, wherein it is determined whether all such points where tuning is necessary have been evaluated. If so, then the process 500 concludes in step 516 with the grating declared to have passed the screening.

Otherwise if, in step 508, the threshold is exceeded, then step 510 is performed to evaluate how long the performance would remain in a degraded state as the tuning occurs. Depending on how stress is applied (thermal, mechanical, etc.) and the profile of the ripple-plus-slope versus applied stress, the performance degradation may be very brief or may be prolonged. For example, in some communication systems, a performance degradation of less than a few milliseconds is tolerable while longer periods of degraded performance cause serious problems. As mentioned earlier, some aspects of the optical grating or of a system comprising the grating, may include time-domain responsiveness to changes in tuning influence. If this behavior has been characterized, then the determination of step 510 may take into account the agility of the unit-under-test to move quickly through conditions of poor performance.

If the duration of degradation is expected to be excessively long, then the grating fails the screening and the process concludes in step 512.

Otherwise, if the duration of degradation is sufficiently short, then execution may proceed from step 510 to step 514 to similarly analyze any other points that require tuning.

If in step 514, it is found that all points that require tuning can be attained without excessive duration or severity of degradation, then the grating is deemed to pass the screening and the process concludes in step 516.

Using process 500 in the evaluating of gratings to be employed as dispersion compensators is optional depending upon the needs of the application. Some systems may be able to switch traffic to alternate links while the grating achieves an optimum operating point, so the severity and duration of degradation may be inconsequential. In other implementations, the tuning may occur very rapidly, such as by electro-optical means, so as to be pose less of a problem. In yet other implementations, the adjustments to the grating may occur primarily during the initial system turn up and testing phase.

The degree to which ripple degrades performance at a particular wavelength may be estimated and expressed in many ways, referred to as quality factors, figures of merit or performance metrics. These estimates of performance in carrying optical signals may be expressed as a function of, or a value averaged over, such parameters as optical signal wavelength, bit rate of modulation applied to the optical signal, format of modulation applied to the optical signal, dispersion slope exhibited by the grating and tuning influence applied to the grating. These performance metrics may also be applied to pass/fail criteria or expression of suitability of a grating to be used under certain conditions.

As one raw form of measurement, the amplitude of ripple in the vicinity of a given wavelength may be measured and expressed in picoseconds peak-to-peak or rms (root-mean-square). This provides a rough estimate of the severity of ripple but does not take into account frequency or phase of the ripple and how these factors may interact with carriers of different modulation bit rates and formats.

In a slightly more sophisticated approach, the ripple may be weighted by a function corresponding to the magnitude of the spectrum or the power spectral density (PSD) of a modulated optical signal. The effects of the ripple can be more specifically and accurately assessed for specific applications of bit rate and modulation format. It is possible for a ripple characteristic at a given wavelength to cause only minor degradation at 2.5 Gb/s or 10 Gb/s, yet be unsuitable for 40 Gb/s. It is also possible that a given ripple characteristic may perform well only at 10 Gb/s, or at only one of the other common bit rates. Furthermore, because an RZ signal occupies twice the spectral width of an NRZ signal, the degradation effects due to ripple may be significantly different for these formats, even for the same carrier wavelength and modulation bit rate.

A non-return-to-zero (NRZ) modulated optical signal is evident as spectrum of frequencies centered on the optical carrier frequency and having a shape corresponding to the function $y=\sin^2(2\pi Fx)/(2\pi Fx)^2$. If the clock frequency of the modulating signal is F, then the modulated spectrum exhibits a null at ±F relative to the carrier center frequency. An RZ modulated signal has a similarly shaped spectrum except that the first null occurs at ±2 F.

Figure 6A:
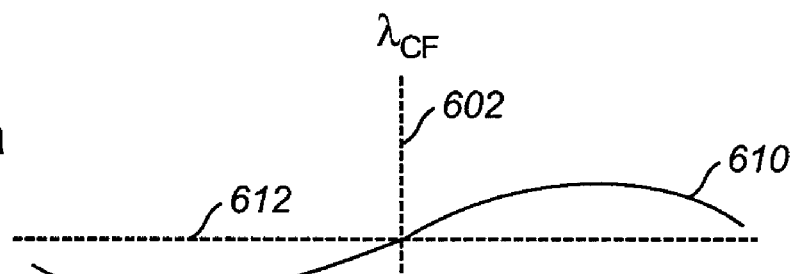
FIGS. 6a-c collectively illustrate a technique for estimating the potential impact of group delay ripple upon a modulated optical carrier signal.
Figure 6B:
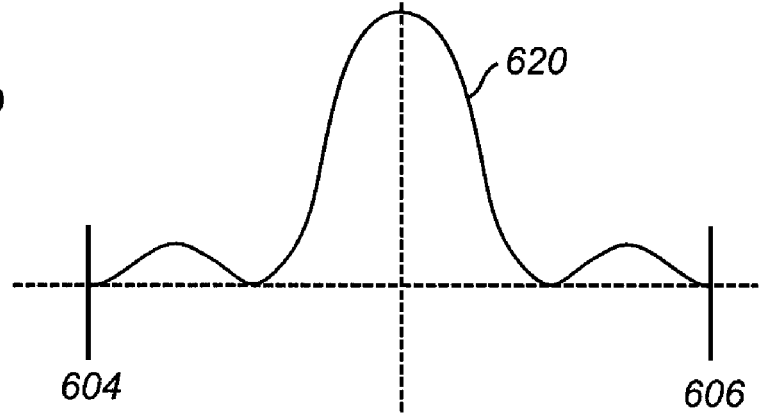
Figure 6C:
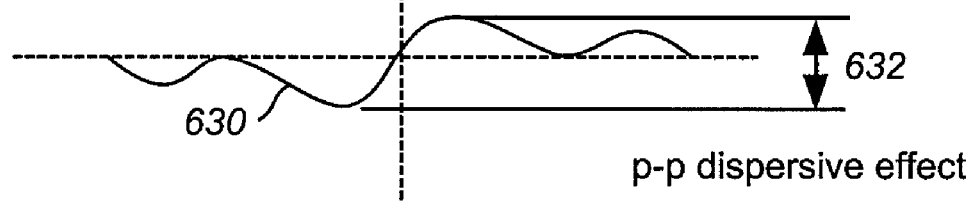

A manner in which the ripple characteristic in the vicinity of a given wavelength may be weighted by the spectrum of a modulated signal is depicted in FIGS. 6a-6c. The horizontal axis in FIGS. 6a-6c represents wavelength and spans a few multiples of the modulating bit rate. For example, the center wavelength 602 may be 1552.52 nm corresponding to a free-space frequency of around 193.1 THz. If the ripple effects are to be assessed for an NRZ modulation at a bit rate of 10 Gb/s, then the horizontal axis for FIGS. 6a-6c should encompass at least a 40 GHz-wide range of frequencies so that the significant spectral energy within the first two nulls may be taken into account. This frequency range corresponds to a range of wavelengths from 1552.36 nm to 1552.69 nm, indicated at wavelengths 604 and 606, respectively.

Assuming these conditions for purposes of illustration then, FIG. 6a represents a ripple characteristic 612 of a grating over the narrow range of wavelengths just described.

The vertical axis in FIG. 6a is the ripple in ps. Line 612 depicts the best fit or nominal desired overall slope for the grating. The deviation of trace 612 from line 610 indicates the variation due to ripple behavior.

The trace 620 in FIG. 6b and depicts the relative spectral energy of a modulated carrier as a function of wavelength. Trace 620 is aligned to center wavelength 602 and may plot the absolute value of the magnitude spectrum of a modulated carrier, which is known to be a sin(x)/x function. Alternatively, trace 620 may represent a power spectral density(PSD) of the modulated signal which is proportional to the square of the magnitude spectrum. In either case, it is preferable and useful for trace 620 to be normalized to a peak amplitude of unity or such that the area under the trace equals unity.

Trace 630 in FIG. 6c is derived by multiplying each point along trace 610 by the corresponding (same wavelength) point of trace 620. Trace 630 represents the ripple (trace 610) weighted by the spectrum of the modulated signal 620 and the vertical axis is expressed in picoseconds. The peak-to-peak amplitude 632 of the product in FIG. 6c indicates the relative severity of the dispersion ripple in conjunction with a particular modulation rate and type. However, trace 630 is not a direct measurement of, for example, power penalty at a receiver.

For expressing performance in more conventional ways, empirical measurements of eye diagrams, power penalty estimates or measurements or bit error rate (BER) may be compiled or mathematically modeled to correlate trace 630 to such measurements. Consequently, the characterization of DGD ripple from a single scan (FIG. 2) may be used to estimate system impact without having to perform empirical measurements at every possible combination of wavelength, bit rate and modulation format.

Even more sophisticated techniques are possible wherein the ripple characteristic of the grating is used develop a transfer function modeling the action of the grating. Thereafter, various signals may be combined with the transfer function, followed by conversion to the time domain to simulate time domain distortion and eye diagram closure, which may, in turn, be used to estimate such things as power penalty or BER.

FIG. 7 illustrates a method for approximating time-domain signal degradation caused by a given ripple characteristic. Similar to FIGS. 6a-6b, FIGS. 7a-7b represent a plot of group delay ripple 710 and a spectral plot 720 aligned on a common wavelength value 702.

At a given first wavelength 703, the value of ripple deviation 713 (deviation from best fit or nominal slope indicate by line 712) is obtained. Then, referring to FIG. 7b, the relative power of the modulating signal at this same wavelength 703 is determined. If curves 710 and 720 are analyzed at evenly spaced ordinate values (of width 722), then each value of trace 720 is proportional to the percentage of the overall energy present at that given wavelength. Thus, it is possible to gauge what proportion of the spectral energy is subject to a given amount of delay.

Figure 7A:
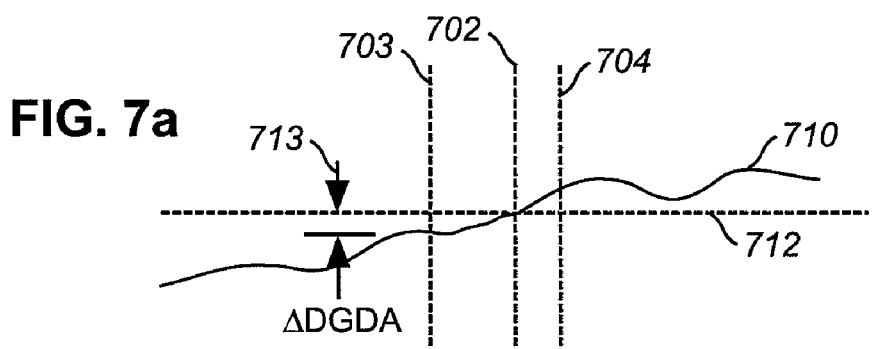
FIGS. 7a-d collectively illustrate a technique for estimating the time-domain effects of group delay ripple and uncorrected dispersion upon a pulse-modulated optical signal.
Figure 7B:
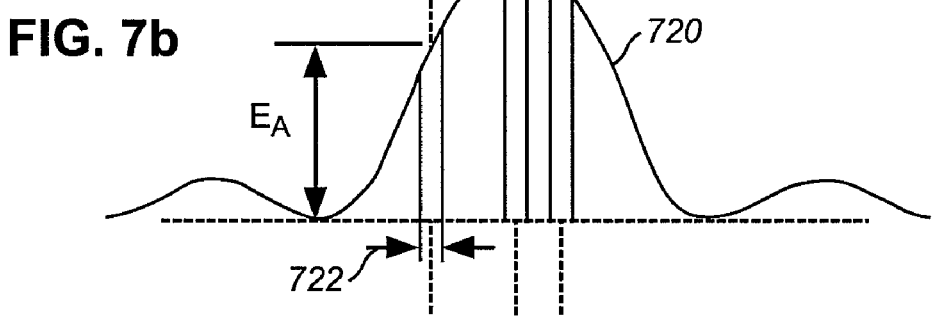
Figure 7C:
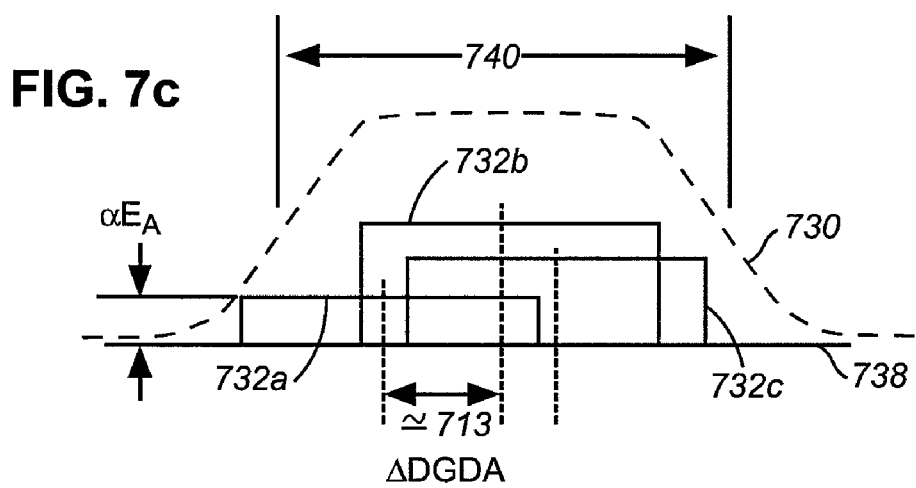
Figure 7D:
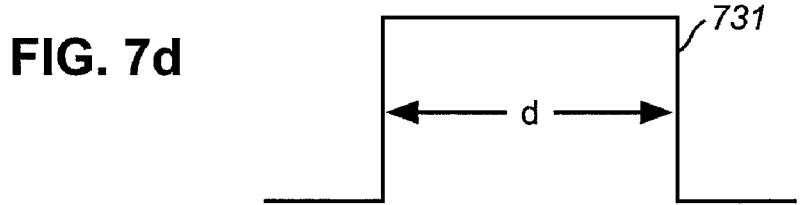

FIG. 7d depicts an ideal pulse 731 having a duration 'd'. For a 10 Gb/s NRZ modulation signal, this pulse may have an initial duration or pulse width of about 90-100 ps. To create an estimate of how this pulse might be distorted by ripple characteristic 710, the following procedure is repeated for each wavelength step within the range depicted in FIGS. 7a-7b.

For each wavelength step, a replica of the input pulse, like that shown in FIG. 7d, is superimposed along an axis 738. One such replica pulse 732a corresponds to the specific values of dispersion ripple and spectral energy at wavelength 703. Replica pulse 732a has the same duration and shape as the input pulse of FIG. 7d, as do all of the replica pulses 732b, 732c and others that will be plotted and summed. The relative amplitude or 'height' of the replica pulse 732a is proportional to the relative spectral energy at wavelength 703, which is taken from the value of trace 720 at wavelength 703. The relative displacement of the replica pulse along the horizontal direction is determined by the value of dispersion ripple 713 obtained from trace 710 at wavelength 703. Likewise, replica 732c may be sized and offset based on the values of traces 710 and 720 at wavelength 704.

Note that in FIG. 7c, the center of the pulse is arbitrarily chosen to be reference point for positioning the replicas, although any portion could be used. Replica 732b, corresponding to the carrier center wavelength 702, provides a good reference point from which all other time displacements may be measured, mainly because the most spectral energy occurs at this wavelength and hence, in the time domain, this will likely be the approximate center of the resulting time domain pulse.

Accordingly, in FIG. 7c, replica 732a is offset in the time domain from replica 732b by an amount determined by ripple value 713.

Replicas 732a, 732b and 732c, as well as other replica pulses pertaining to different wavelength steps, may be plotted along axis 738. The horizontal axis 738 represents time, which may conveniently be expressed in picoseconds. The vertical axis of FIG. 7c represents relative power or intensity or amplitude and the scaling of this axis is relatively unimportant.

By adding together all such replica pulses 732a-c, etc. an overall estimate of the resultant time-domain pulse 730 may be constructed. FIG. 7c is a time domain estimate of modulation pulse waveform having experienced the group delay ripple of trace 710. This composite time-domain pulse may then be analyzed in several ways.

The full width of the pulse at half maximum (FWHM) may be measured (as indicated by dimension 740) and compared to the ideal input pulse width 'd' (from FIG. 7d) to determine the extent to which the ripple has broadened the pulse.

Time-domain pulse 730 may also be analyzed in the form of an eye diagram and degradation may be expressed in terms of eye diagram closure. Further correlation between time domain or eye diagram characteristics, as are well known, may lead to expressing performance degradation in terms of BER or receiver power penalty.

Figure 8:
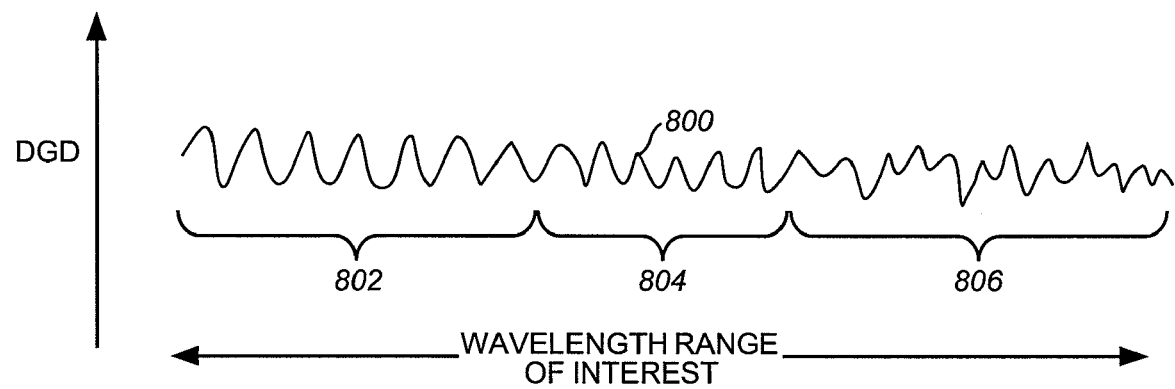
FIG. 8 is a plot of group delay indicating areas where a ripple characteristic may exhibit some degree of periodicity.

FIG. 8 depicts a portion of a DGD ripple trace 800, which may be obtained by measuring a group delay of a chirped grating over a range of wavelengths and then subtracting the overall scan with a line related to the average slope of the grating. FIG. 8 indicates that some portions of ripple characteristic 800 may exhibit substantially periodic behavior such that the behavior of the grating may be generalized for a range of wavelengths. For example, in FIG. 8, ripple characteristic 800 may be divided into portions 802, 804, 806 that may each have adequate periodic or quasi-periodic content to enable summarized characterization. Note that the boundaries between regions are defined by points at which frequency drift or phase shifting begin to diminish the accuracy of the generalization. A first grating may be summarized in relatively few such segments whereas a second grating may have such a complex ripple characteristic that this approach is of little value. Nevertheless, many gratings exhibit reasonable periodicity over a small range of wavelengths that some localized generalizations can at least be made.

A grating ripple characteristic may have a mixture of relatively periodic sections, similar to section 804, and less periodic sections such as section 806. The grating characteristic may be described in piecewise fashion, with some ranges of wavelengths summarized and other ranges characterized point by point.

Figure 9:
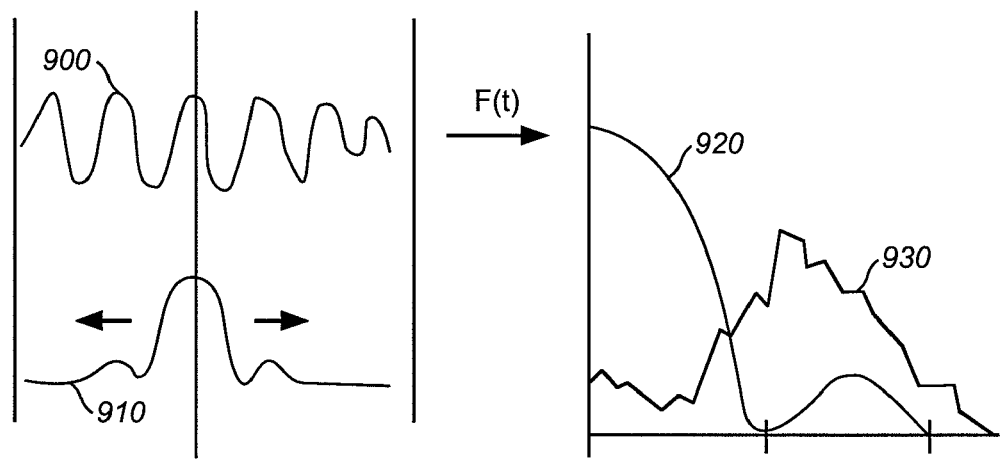
FIG. 9 illustrates a frequency-domain analysis of delay ripple coincident with the spectral distribution of a modulated optical signal.

FIG. 9 illustrates a method for characterizing a grating over a range of wavelengths where the ripple has some degree of periodicity or wherein characterizing the ripple in the frequency domain maintains reasonable accuracy. Note that, in trace 800 shown above, separate portions 802, 804 and 806 may each have some relatively pure periodic components but that performing a Fourier analysis on the entire trace may mask some components because of phase and frequency shifting that occurs over the domain of the trace. Depending on inaccuracies in phase and frequency, this method may only serve as an estimate of the performance of the grating.

In FIG. 9, a small section of a ripple trace 900, perhaps covering less than a few nanometers in wavelength, is shown superimposed over the spectrum of a modulated signal 910. While it is possible to vary the carrier wavelength of the modulated signal and assess the performance over the range shown, an alternative technique involves performing a frequency-domain analysis by performing a Fourier transform of the DGD ripple trace.

The resultant spectrum of the ripple 930 is plotted on the right side of FIG. 9. Having taken the Fourier transform of a ripple that was expressed in ps/nm, the 'frequency' of the transformed trace 930 must be expressed in reciprocal nanometers. The height of trace 930 represents magnitude of ripple in picoseconds.

The ripple spectrum 930 is compared to the modulating signal spectrum 920 (one half of the familiar sin(x)/x curve) by aligning the traces 920 and 930, as shown, along a common axis. For example, the first null of a 10 Gb/s NRZ signal is shown to occur at point 925. This is taken to be an ordinate value of 10 GHz. When properly aligned, this point along the ripple spectrum 930 represents the amount of ripple occurring with a 10 GHz period between successive ripples.

To estimate the relative effects of the ripple upon a modulated carrier having a particular bit rate and format, traces 920 and 930 are simply multiplied by one another and then an overlap integral may be calculated. Once trace 930 has been determined, this process may easily repeated for varying spectral shapes 920 corresponding to various bit rates and formats. The process illustrated in FIG. 9 inherently averages the effects of the ripple across the entire range of wavelengths taken into account in the left half of FIG. 9. If it is sufficiently accurate to describe the behavior of a grating, the frequency-domain approach depicted in FIG. 9 may be preferable to the time-domain reconstruction described in FIGS. 7a-7c because it may be calculated more efficiently.

Figure 10:
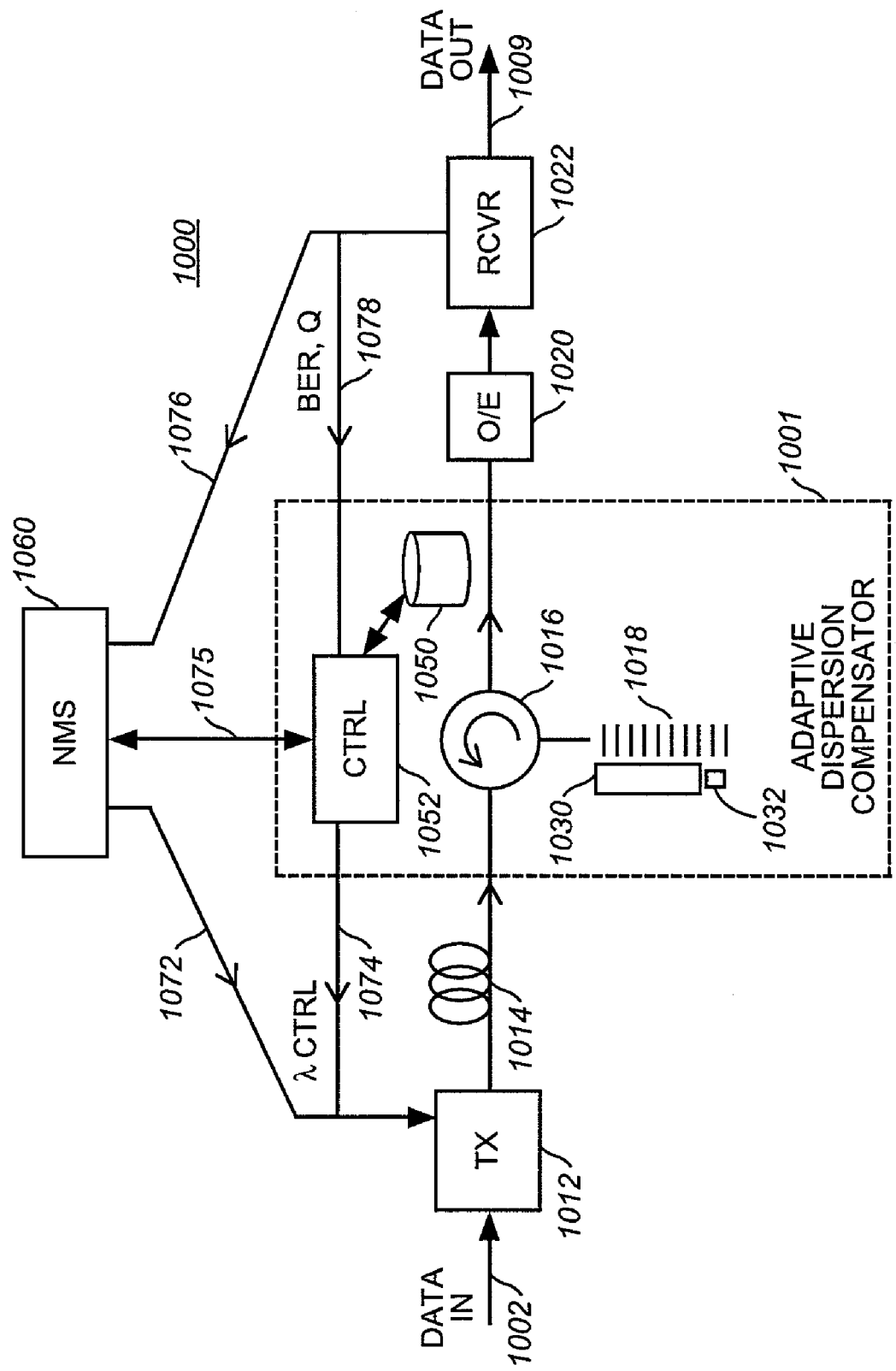
FIG. 10 depicts an optical link employing a dispersion compensating grating in accordance with an exemplary embodiment of the present invention.

FIG. 10 depicts an optical link 1000 employing a grating as a dispersion controlling element in accordance with an exemplary embodiment of the present invention. Data signals representing communications traffic are supplied at input 1002 and act to modulate transmitter 1012. The modulated optical signal from transmitter 1002 propagates through a length of optical fiber 1014, which may be of considerable length and may cause significant dispersion. To correct or alter the dispersion experienced by the signal, dispersion compensator 1001 is coupled to the optical signal. Dispersion compensator 1001 employs grating 1018 as a dispersion-affecting element.

The output of dispersion compensator 1001 is coupled to an optical/electrical transducer (O/E) 1020. As explained before in conjunction with FIG. 1, dispersion compensator 1001 may actually be preceded or followed along the link by more lengths of optical fiber and by other dispersion-modifying elements such as similar compensators or lengths of dispersion compensation fiber. The electrical signal from O/E 1020 is provided as input to receiver 1022 which then renders a data signal along output 1009 which should be comparable to the input signal provided at input 1002.

Dispersion compensator 1001 comprises grating 1018 and optical circulator 1016. Dispersion compensator 1001 may comprise an actuator 1030 for applying stress to grating 1018. Dispersion compensator 1001 may further comprise sensor 1032 for monitoring the stress experienced by the grating.

Dispersion compensator 1001 is shown to comprise a controller 1052. Controller 1052 serves many roles. Controller 1052 may control actuator 1032 in response to indications from sensor 1032 to ensure that a proper stress is applied to grating 1018. As shown, controller 1052 may be communicably coupled to any or all of transmitter 1012, receiver 1022 and network management system (NMS) 1060. Controller 1052 may receive directions from other elements to establish a given dispersion slope or grating stress.

Via connection 1075, for example, NMS 1060 may instruct the dispersion compensator 1001 to be set at −310 ps/nm slope, whereupon controller 1052 may determine what stress level is needed to provide the requested slope and may perform the adjustment accordingly.

Alternatively, NMS 1060 may indicate to controller 1052 what stress level to apply to the grating or whether to simply increase or decrease stress from current levels. As yet another alternative, controller 1052 may simply receive quality indicators from other elements, such as receiver 1022 along connection 1078, so that the controller can make decisions to optimize the quality. Receiver 1022 may communicate information, such as BER or Q-factor, directly to controller 1052 for this purpose. Receiver 1022 may also (or instead) communicate signal quality information to NMS 1060, along connection 1076, which may be used in issuing indirect instructions to control dispersion compensator 1001.

As controller 1052 seeks to accurately control grating 1018 to meet the needs of link 1000, data store 1050 may be accessed to retrieve any manner of characterization data as may have been measured and stored earlier such as in data store 350 in FIG. 3. Controller 1052 may use grating characterization data to determine what stress is required to reach a particular operating point, to assess and report projected performance characteristics and to determine best trajectories between operating points. If the grating characterization includes time-domain response information, controller 1052 may use this information to achieve stable or critically damped control of the grating and other system components.

In accordance with some implementations, the carrier wavelength of the transmitter 1012 may be subject to control or fine tuning. As described earlier, the ability to alter carrier wavelength, even slightly or temporarily, adds a favorable dimension of control so that regions of poor grating performance can be avoided. This also provides some latitude for compensating for fiber changes as a function of temperature. Controller 1052 may be able to select a tuning trajectory and coordinate various elements to minimize performance problems as the grating is tuned from one operating point to another. Via connection 1074, controller may directly control transmitter wavelength. Alternatively, controller 1052 may communicate with NMS 1060 so that transmitter wavelength may be controlled by instructions along connection 1072. It is commonplace for a network management system to exercise such control over optical transmitters. Either or both of NMS 1060 and controller 1052 may receive sensory inputs from and exercise control over the other elements to form an overall control system.

In some implementations, the grating may not be subject to control even though carrier wavelength is controllable. The characterization information pertaining to the grating for accurate control of wavelength to make best use of the characteristics of the grating.

Another use for characterization information relates to identifying sets of particular gratings that may be advantageously employed as a group along a common link and to allowing cooperative control among multiple grating devices along a link.

Figure 11:
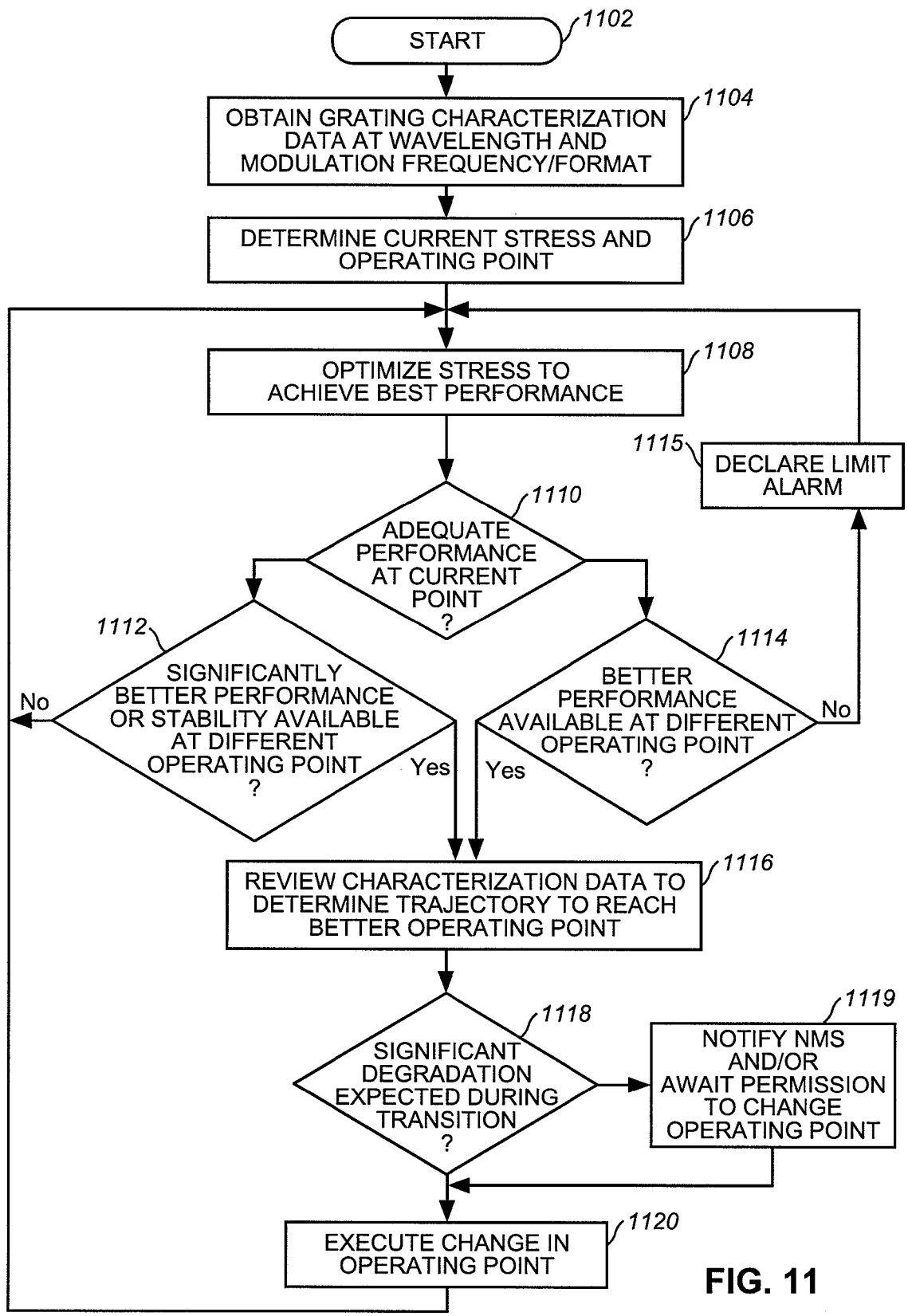
FIG. 11 depicts a process by which a grating may be controlled to provide dispersion compensation in accordance with an exemplary embodiment of the present invention.

FIG. 11 illustrates a process 1100 by which a grating may be controlled to provide adequate performance while in use. Process 1100 may be performed by controller 1052 or cooperatively among the controller or other elements that were shown in FIG. 10.

Process 1100 commences in step 1102 upon initialization (such as at power-on) of a dispersion compensating system employing a grating that has been characterized, for example, using a process similar to process 900.

In step 1104, the characterization data is obtained pertaining to the wavelength and modulation frequency and format of the modulated signal to which the grating is currently being applied.

In step 1106, the current operating point of the grating is determined. This means determining the current level of stress applied to the grating and correlating the stress level to a region within the operating characteristics of the grating as indicated in the characterization data of the grating. This initial point of operation may correspond to region 230 of FIG. 2, for example.

In step 1108, the stress applied to the fiber is controlled to optimize the performance that may be realized within the vicinity of the operating point, e.g. with the parameters remaining roughly the same.

In step 1110, it is determined whether the performance achievable by localized optimization is adequate. If it is not adequate, then execution proceeds to step 1114 wherein it is determined, by consulting the characterization data whether any other operating points might offer better performance. If it is evident from the data, that any other reachable operating points would only result in comparable or worse performance, then execution proceeds to step 1115 wherein a limit alarm is declared and reported to a supervisory function or network operations center to report that the degradation is uncontrolled. Following step 1115, execution returns to step 1108 such that the process continues to try to optimize the performance at the current operating point as best possible despite the poor conditions that exist.

If, in step 1114 another operating point appears promising, then execution proceeds to steps 1116 through 1119 to initiate changing to the alternative operating point, as will be explained below.

Returning to step 1110, if it is determined that the current operating point provides adequate performance, then execution continues at step 1112 wherein it is determined whether some other operating point would provide such a dramatic improvement in performance as to justify changing. If this is the case, then execution proceeds to steps 1116 through 1119 to initiate changing to the alternative operating point. Otherwise, step 1112 leads back to step 1108 to maintain optimal tuning in the vicinity of the same current operating point. It is preferable that step 1112 implement a hysteresis effect to avoid frequent switching or oscillation among two or more operating points of comparable quality.

Step 1116 is performed whenever a change in operating points is necessitated by poor performance at a current operating point or when an alternative operating point offers compelling advantages over the current operating point. The latter decision may relate to low dispersion error or ripple, improved control stability or reduced energy consumption, for example. The choice of operating point may be frequently evaluated due to changes in the fiber plant and its dispersion behavior.

In step 1116, the characterization data pertaining to the grating is review to determine an acceptable or optimum trajectory by which to reach the new operating point. In cases where some control of carrier wavelength is available, this trajectory may involve, for example, altering stress on the fiber while causing wavelength to shift slightly. In the case where wavelength is fixed, the trajectory is typically a straight transition from one stress level to another, although the application of force or temperature as a function of time may be profiled to minimize the duration of any severely degraded conditions.

In step 1118, it is determined from the characterization data whether a significant degree of signal degradation is likely during the transition to the new operating point. If so, then step 1119 is performed involving one or both of a) notifying a network management system or supervisory function that a degradation will occur, and b) obtaining permission to proceed with the transition. These options enable better coordination of transition events to minimize disruption of communications traffic.

Whether in step 1118 it is found that no significant degradation will occur or that, in step 1119, sufficient notification or permission has been provided for, step 1120 is then executed to invoke the transition to the new operating point that was identified in steps 1112 or 1114.

Once the transition has occurred, then execution returns to step 1108 to pursue fine-tuning optimization in the vicinity of the new operating point.

In process 1100, the choice of an operating point is constantly revisited as indicated by the looping through steps 1112 and 1114.

It is possible that dispersion slope encountered in the field may differ slightly from what is anticipated. Consequently, the choice of an optimum operating point may shift when the grating is in use. One situation that may give rise to changing dispersion compensation requirements is the possibility of switching of optical paths in an all-optical network.

For example, a dispersion compensation having a nominal dispersion slope of −300 ps/nm may be deployed where a fiber optical link is estimated to have a dispersion of +300 ps/nm. However, the actual conditions, due to aging of the fiber, temperature changes along the fiber, behavior of other elements along the link affecting dispersion or slightly different characteristics than estimated, the compensation required may be closer to −315 ps/nm. In accordance with the present teachings, the forehand characterization of the grating is used by an adaptive compensator to improve the handling of this situation. With awareness of the behavior of the grating over a wide variety of conditions, a controller may efficiently move to favorable operating regions despite intervening regions of poor performance that would normally pose a barrier to simple feedback mechanisms. Another advantage is that a controller can declare and alarm condition when it is determined that a favorable operating region is not attainable.

Furthermore, pre-characterization of operating points allows a dispersion compensating device to forewarn an external system or element, such as a supervisory function or network management system, of an impending performance degradation as may be anticipated in transitioning from one operating point to another. The device may also coordinate with a supervisory function to await permission before proceeding to perform the recommended transition. This allows the system to perform preemptive switching or moving of traffic before the change takes place.

By virtue of stored characterization information, the dispersion compensating device may also be able to respond to hypothetical requests from an external element. For example, the dispersion compensating device may be queried as to how well it could perform at a given wavelength and dispersion slope. This may not be an optimum point for the grating but the device could nevertheless provide an estimate of performance degradation expected whereupon the supervisory function could decide whether the adjustment should be invoked. A supervisory function may similarly consult with several devices, such as measurement devices, optical receivers with quality monitors, and other dispersion compensation modules to determine an appropriate course of action that provides adequate or optimum performance for the overall section, link, path or system. It may also be desirable to provide grating control information from modeled data at a network owner's headquarters or testing laboratory.

A dispersions compensating device according to the present teachings may provide to a supervisory function an estimate of 'downtime' or stabilization time that is expected as the grating transitions from one operating point to another. This information, derived from the characterization information, may be taken into account by the supervisory function in deciding how adjustments should be made along the optical link or path. Estimating downtime may be facilitated by having time-domain responsiveness of the grating included in the characterization information accessible to the dispersion compensator.

An additional advantage of the present teachings of storing pre-deployment characterization data of a grating and using the data while controlling the grating in an optical link is that control trajectories between operating points can also be optimized. In passing from one operating point to another, it may be possible to carefully control stress on the grating in conjunction with, for example, carrier wavelength to maintain acceptable performance throughout the transition. The characterization data may provide a mapping of characteristics that are reviewed by the control system or by a supervisory system. From the data, the control system may decide a useful trajectory to meet the present purposes. Alternatively, the optimum trajectory may be determined before deployment and stored as part of the pre-characterization data. The control system may then simply look up and execute the trajectory to begin the tuning process.

Characterization data for a given grating may also be stored outside of the dispersion compensating unit where the grating is employed. A network management system or supervisory function may maintain the data and provide it to the controller as needed or may make decisions based on the data and merely direct the device apply a certain level of stress to the grating.

It is contemplated that dispersion compensation devices employing techniques as taught herein may also perform peer-to-peer coordination or 'negotiation' to mutually decide on effective actions to ensure adequate link performance. It is also contemplated that a single device, such as dispersion compensator 1001, may perform self-characterization by implementing a process similar to process 400 described earlier. This may be performed, for example, just prior to deployment or while the optical link is idle. Multiple concatenated gratings or dispersion compensating devices may similarly be able to participate in a self-characterization of the collective response of the gratings or devices.

To summarize the foregoing approximation and estimation techniques, one manner of assessing performance degradation due to ripple is to model the effects of the ripple upon the modulated waveform in the time domain and express the impact in terms of a signal quality indicator such as bit error rate (BER), power penalty, eye pattern degradation or RMS (root mean square) or peak-to-peak differential group delay. This value may be compared to that of a theoretical non-rippled grating to calculate a differential degradation of the ripple effect itself. Of course, in the case of dispersion compensating gratings (DCGs) that intentionally have an overall DGD slope, the slope may simply be subtracted out of the initial raw DGD measurements, yielding only a ripple characteristic that may then be subjected to the processes just described.

In accordance with an alternative approach, the ripple plot is tested at a specific carrier wavelength, as will be described, and the analysis is repeated with any desired level of granularity across the entire operating range. The resulting measurements may be combined into an overall figure of merit or may be plotted as a function of carrier frequency to show how performance varies across the operating range.

At each carrier frequency, a small portion of the ripple plot is directly multiplied with the appropriate RZ or NRZ spectrum centered on the carrier frequency and extending on both sides by at least one or two multiples of the modulating clock frequency. In a sense, the modulating spectrum shape is used as a weighting or 'windowing function' to sample the ripple plot. The peak-to-peak or RMS amplitude of the resulting product effectively represents time domain DGD effects that would result from the ripple. This approach inherently takes into account ripple phase and any other effects to show a true picture of the localized ripple effect. This may then be used to model the time-domain waveform, which may then be correlated to power penalty or BER degradation.

It is common practice to filter out finer high frequency components of ripple or to take ripple measurements using a high enough modulating frequency so as to disregard fine components. For example, the use of a 1 GHz modulating frequency for probing DGD using a test instrument tends to filter out components that appear when a 300 MHz or 100 MHz modulating frequency is used. This is done because in practice, in the context of a traffic-bearing 10 GHz modulation signal for example, the finer short-period ripple components are generally found to be harmless. It is believed that the present teachings inherently take proper account of such short-period ripple components. Alternatively, obtaining the ripple plot using a suitably high modulation frequency or performing low-pass filtering of the ripple signal before or after multiplying with the modulation spectrum will similarly remove unimportant features.

The process just described may be repeated across numerous portions of the overall operating range of the grating. It is contemplated that specific wavelengths according to the ITU standard 'grid' of carrier wavelengths may be used in the above analysis so that the performance data or figure of merit pertains to wavelengths that will actually be used in the field.

The ripple plot and modulation spectrum can also be applied to determining time-domain effects. Generating a time-domain eye pattern from a modulation spectrum envelope and delay ripple function is fairly simple. It is assumed that the ripple plot is sampled with sufficiently fine frequency resolution so that there are several samples within a window that is two to four times the modulating frequency. Once a nominal carrier frequency is chosen about which to center the analysis, a range of sample points along the ripple plot are defined by the limits of the modulation envelope superimposed on the carrier frequency. It is assumed that the original modulation pulse is a square pulse of a given pulse width. A series of square pulses, each being an image of the original modulation pulse but being modified in amplitude and time offset, are added together as follows.

Each sample point falling within the aforementioned range corresponds to one of the square pulse components. The amplitude of the square pulse is determined by the normalized amplitude of the modulation envelope (the $\sin(x)/x$ squared function mentioned earlier) at the frequency of the sample point. The relative delay of the square pulse is determined by the DGD value corresponding to the sample point. Once these square pulses are added together, the overall effects in the time domain may be observed and may be correlated to power penalty or BER degradation, for example.

From the foregoing description, it may be seen that the present invention provides a method and system for assessing the performance of a dispersion compensating grating or other dispersion-affecting element, especially considering the effects of delay ripple. The present invention may also provide for improving the performance of a dispersion compensating grating or the like as it is used in an optical communication system. Methods and devices of the present invention have been shown and described with reference to various exemplary embodiments, but the present invention should not construed as being limited in any way by the description of particular aspects of these illustrative embodiments. The spirit and scope of the present invention may be determined from the following claims.

What is claimed is:

1. A method comprising:
    coupling an optical signal to a dispersion-affecting element of an optical commumcation system;
    applying a tuning influence to the dispersion-affecting element;
    measuring a response of the dispersion-affecting element to the optical signal;

deriving characterization information that indicates the response of the dispersion-affecting element to the tuning influence; and in a data storage element, recording the characterization information related to the measurement.

2. The method of claim 1, where the tuning influence is applied by an actuator to apply a variable tuning influence to the dispersion-affecting element.

3. The method of claim 1, where applying the tuning influence comprises applying at least one of heat or cold to the dispersion-affecting element.

4. The method of claim 1, where applying the tuning influence comprises physically altering the dispersion-affecting element.

5. The method of claim 1, where applying the tuning influence comprises applying physical energy to the dispersion-affecting element.

6. The method of claim 1, where applying the tuning influence comprises applying at least one of an electrical or a magnetic field to the dispersion-affecting element 7. The method of claim 1, further comprising:
based on the characterization, automatically determining whether the dispersion-affecting element falls within a predetermined acceptable operating range.

8. The method of claim 1, further comprising:
applying the tuning influence to the dispersion-affecting element in a plurality of different amounts; and
deriving characterization information based on the response of the dispersion-affecting element to each of the applied amounts of the tuning influence.

9. The method of claim 1, where the derived characterization is further based on a response of the dispersion-affecting element to a modulated optical signal.

10. A system comprising:
an optical transmitter to transmit a first optical signal;
a dispersion-affecting element to:
receive the first optical signal, and
output a second optical signal;
an attenuator to apply a tuning influence to the dispersion-affecting element; and
at least one analysis device to:
receive the second optical signal from the dispersion-affecting element, and
derive characterization information based on the received second optical signal, where the characterization information indicates a response of the dispersion-affecting element to the tuning influence.

11. The system of claim 10, where the at least one analysis device includes at least one of an oscilloscope or a receiver.

12. The system of claim 10, where the at least one analysis device includes a dispersion test set to measure variations in group delay.

13. The system of claim 10, where the attenuator includes at least one of a heating or a cooling element thermally coupled to the dispersion-affecting element.

14. The system of claim 10 further comprising an optical signal modulator coupled to the optical transmitter, where the derived characterization information is further based on a response of the dispersion-affecting element to a modulated optical signal.

15. The system of claim 10 further comprising a data store to store the derived characterization information.

16. The system of claim 10 further comprising logic to automatically determine, based on at least the derived characterization information, whether the dispersion-affecting element falls within a predetermined operating range.

17. The system of claim 10, where the attenuator is a variable attenuator to apply the tuning influence in a plurality of different amounts.

18. The system of claim 10 further comprising a sensor to detect an amount of tuning influence applied to the dispersion-affecting element.

19. A device comprising:
means for coupling an optical signal to a dispersion-affecting element of an optical communication system;
means for applying a tuning influence to the dispersion-affecting element;
means for measuring a response of the dispersion-affecting element to the optical signal;
means for deriving characterization information based on the response of the dispersion-affecting element to the tuning influence; and
means for recording the characterization information related to the measurement.

20. The device of claim 19, where the derived characterization information is further based on a response of the dispersion-affecting element to a modulated optical signal.

* * * * *